(12) United States Patent
Shimura

(10) Patent No.: US 9,270,163 B2
(45) Date of Patent: Feb. 23, 2016

(54) POWER SOURCE, POWER FAILURE DETECTION APPARATUS, AND IMAGE FORMING APPARATUS

(71) Applicant: CANON KABUSHIKI KAISHA, Tokyo (JP)

(72) Inventor: Yasuhiro Shimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 13/752,772

(22) Filed: Jan. 29, 2013

(65) Prior Publication Data

US 2013/0195497 A1 Aug. 1, 2013

(30) Foreign Application Priority Data

Jan. 31, 2012 (JP) ................................ 2012-018911
Jan. 31, 2012 (JP) ................................ 2012-018912

(51) Int. Cl.
| | |
|---|---|
| *H02M 1/36* | (2007.01) |
| *H02M 1/32* | (2007.01) |
| *H02J 9/00* | (2006.01) |
| *G03G 15/00* | (2006.01) |
| *H02M 7/217* | (2006.01) |

(52) U.S. Cl.
CPC ................. *H02M 1/36* (2013.01); *G03G 15/80* (2013.01); *H02J 9/005* (2013.01); *H02M 1/32* (2013.01); *H02M 7/217* (2013.01)

(58) Field of Classification Search
CPC ........... H02M 1/32; H02M 1/36; H02M 7/06; H02M 7/217; H02M 2001/322
USPC ............ 323/271–275, 282–285, 207; 363/53, 363/56.08–56.11, 84, 126, 89; 399/33, 37, 399/69–70, 88
See application file for complete search history.

(56) References Cited

U.S. PATENT DOCUMENTS

| | | | | |
|---|---|---|---|---|
| 5,650,694 | A * | 7/1997 | Jayaraman et al. ............ | 315/225 |
| 5,986,242 | A * | 11/1999 | Maitani et al. ................. | 219/501 |
| 6,408,148 | B1* | 6/2002 | Yamamoto ...................... | 399/88 |
| 7,949,885 | B2* | 5/2011 | Kikuchi et al. ................ | 713/300 |
| 8,494,383 | B2* | 7/2013 | Shimura et al. .................. | 399/37 |
| 8,655,216 | B2* | 2/2014 | Mori ............................... | 399/88 |

(Continued)

FOREIGN PATENT DOCUMENTS

| | | |
|---|---|---|
| CN | 201260129 Y | 6/2009 |
| JP | H10-185965 A | 7/1998 |

(Continued)

*Primary Examiner* — Timothy J Dole
*Assistant Examiner* — Yusef Ahmed
(74) *Attorney, Agent, or Firm* — Canon USA, Inc. IP Division

(57) ABSTRACT

A power source includes a rectifying unit configured to full-wave rectify an AC voltage to be input, a first and second converter configured to convert the voltage rectified by the rectifying unit, a zero cross detection unit configured to detect a zero cross of the AC voltage, a voltage detection unit configured to detect the AC voltage, a first capacitance element connected across a potential after being subjected to rectification by the rectifying unit and a ground, a first discharging resistor configured to discharge electric charges charged in the first capacitance element, a first switch unit configured to cut off a current flowing to the first discharging resistor and a stopping unit configured, in a case where the AC voltage is detected by the voltage detection unit and the detected voltage is smaller than a threshold value, to stop the operation of the second converter.

12 Claims, 22 Drawing Sheets

(56) References Cited

U.S. PATENT DOCUMENTS

| | | | |
|---|---|---|---|
| 8,760,130 B2* | 6/2014 | Yamaguchi | 323/265 |
| 8,958,713 B2* | 2/2015 | Inukai | 399/88 |
| 8,965,236 B2* | 2/2015 | Inukai | 399/88 |
| 2002/0131788 A1* | 9/2002 | Nakaya | 399/88 |
| 2003/0122591 A1* | 7/2003 | Nakata et al. | 327/79 |
| 2003/0136777 A1* | 7/2003 | Okubo | 219/492 |
| 2004/0146311 A1* | 7/2004 | Kawazu et al. | 399/45 |
| 2004/0208667 A1* | 10/2004 | Nakaya | 399/88 |
| 2005/0151524 A1* | 7/2005 | Sae-Ueng et al. | 323/282 |
| 2006/0078344 A1* | 4/2006 | Kawazu et al. | 399/69 |
| 2006/0093388 A1* | 5/2006 | Kawazu et al. | 399/69 |
| 2007/0280720 A1* | 12/2007 | Kimura | 399/88 |
| 2008/0155294 A1* | 6/2008 | Kikuchi et al. | 713/340 |
| 2008/0267643 A1* | 10/2008 | Takami | 399/33 |
| 2009/0003868 A1* | 1/2009 | Namiki et al. | 399/69 |
| 2009/0142081 A1* | 6/2009 | Hong | 399/37 |
| 2010/0166449 A1 | 7/2010 | Hong | |
| 2010/0195352 A1* | 8/2010 | Murofushi | 363/20 |
| 2010/0247131 A1* | 9/2010 | Sato et al. | 399/70 |
| 2011/0068751 A1 | 3/2011 | Lin | |
| 2011/0080110 A1* | 4/2011 | Nuhfer et al. | 315/291 |
| 2011/0176341 A1 | 7/2011 | Huang | |
| 2011/0299868 A1* | 12/2011 | Ito | 399/69 |
| 2012/0080947 A1* | 4/2012 | Karino et al. | 307/31 |
| 2012/0148273 A1* | 6/2012 | Shimura et al. | 399/33 |
| 2012/0153930 A1* | 6/2012 | Goto | 323/311 |
| 2012/0155895 A1* | 6/2012 | Shimura | 399/33 |
| 2012/0155905 A1* | 6/2012 | Ogura | 399/68 |
| 2012/0207505 A1* | 8/2012 | Kobayashi et al. | 399/88 |
| 2013/0148998 A1* | 6/2013 | Shimura | 399/88 |
| 2013/0334884 A1* | 12/2013 | Arisawa et al. | 307/43 |
| 2014/0119749 A1* | 5/2014 | Mashiki | 399/33 |
| 2014/0198337 A1* | 7/2014 | Nakajima et al. | 358/1.14 |
| 2014/0210264 A1* | 7/2014 | Inukai | 307/23 |

FOREIGN PATENT DOCUMENTS

| | | |
|---|---|---|
| JP | 2001-306160 A | 11/2001 |
| JP | 2003-199343 A | 7/2003 |
| JP | 2006280131 A | 10/2006 |
| JP | 2007-312518 A | 11/2007 |
| JP | 4080764 B2 | 4/2008 |
| JP | 2008-118768 A | 5/2008 |
| JP | 2009-251275 A | 10/2009 |
| JP | 4446136 B2 | 4/2010 |
| JP | 2011-053400 A | 3/2011 |
| JP | 2011-067075 A | 3/2011 |
| TW | 201138253 A | 11/2011 |

* cited by examiner

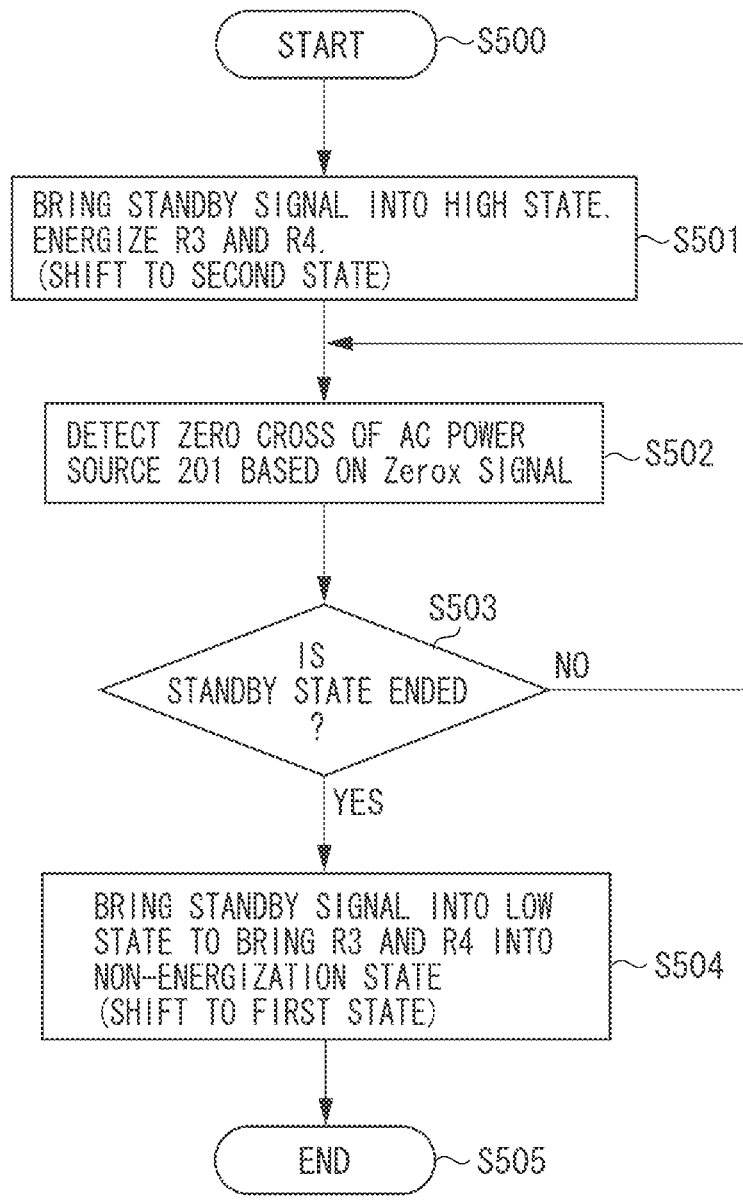

POWER SOURCE, POWER FAILURE DETECTION APPARATUS, AND IMAGE FORMING APPARATUS

BACKGROUND OF THE INVENTION

1. Field of the Invention

The present invention relates to a power source and a power failure detection apparatus provided on an image forming apparatus such as a copying machine, a printer, and a facsimile machine.

2. Description of the Related Art

A state where an alternating current (AC) voltage is not supplied from a commercial AC power source to an apparatus (which is also referred to as "power failure state") includes a case where the supply of an AC voltage from the commercial AC power source is cut off due to power failure, a case where the supplied AC voltage falls below the specifications of the apparatus, and a case where a power cable is pulled out by a user while the apparatus is operating. It is desirable to stop a power source circuit after the power failure state is detected and the apparatus is shifted to a state where the apparatus can be normally stopped. Japanese Patent Publication No. 4080764 discusses a method for shifting to a state where the apparatus can normally stopped such that a first converter (an insulative DC/DC converter) and a second converter (an insulative DC/DC converter) are connected in parallel to a full-wave rectification circuit of the power source, thereby detecting the power failure state and stopping the second converter to cause the first converter to continue supplying power for a certain period of time.

There has been known a fixing device which is provided on an image forming apparatus such as a copying machine, a printer, and a facsimile machine, fixes an image to a recording medium, and includes an endless belt, a ceramic heater coming into contact with the inner surface of the endless belt, and a pressure roller forming a nip portion with the ceramic heater via the endless belt. As a means of controlling a power supplied to the fixing device, a method is used which performs phase control of the power supplied from the commercial AC power source using a switching element such as a triac. The phase control of the supplied AC-voltage waveform requires accurately detecting a timing when the AC voltage becomes zero volts, i.e., zero cross timing (hereinafter referred to as "zero cross") as timing being the reference of phase control. Japanese Patent Application Laid-Open No. 2003-199343 discusses a circuit for detecting the zero cross timing.

In a case where the power failure state is detected by detecting the AC voltage when a power cable is pulled out by the user, among the above power failure state, a decrease in voltage of the power source circuit is delayed by the influence of electric charges charged in an X capacitor provided for inhibiting noises of the power source, taking time to detect the power failure state. The resistance of a resistor discharging the X capacitor is reduced to allow the delay to be improved. On the other hand, a further reduction in power in a standby state in which the apparatus is not operated is strongly demanded, so that the power consumption of a circuit for detecting the power failure state also needs to be reduced or inhibited. In other words, an early detection of the power failure state and a reduction of power consumption in the standby state of the apparatus are demanded.

In recent days, there has been a demand for further reduction in power consumption during a state where the apparatus is not operated (an operation standby state). If an X capacitor discharging resistance for discharging the X capacitor is provided, the X capacitor discharging resistance consumes power with the apparatus being not operated. In other words, the X capacitor discharging resistance impedes reduction in power consumption in the operation standby state. The power consumption of the power source circuit is increased, so that a method is used in which a state where a power cable is pulled out is detected and the X capacitor is discharged. On the other hand, Japanese Patent Publication No. 4446136 discusses a configuration in which a state where a power cable is pulled out is detected to discharge the X capacitor, as a method for discharging the X capacitor while the power consumption of the power source is being reduced. In the method discussed in Japanese Patent Publication No. 4080764, little discharge current flows into the X capacitor in a state where the apparatus is not operated (an operation standby state), so that power consumption can be reduced.

The method discussed in Japanese Patent Publication No. 4446136 has a problem that the circuit scale of the power source increases. Therefore, there has been demanded a reduction in power consumption with a simple circuit configuration.

SUMMARY OF THE INVENTION

According to an aspect of the present invention, a power source includes a rectifying unit configured to full-wave rectify an alternating current (AC) voltage to be input, a first converter and a second converter configured to convert the voltage rectified by the rectifying unit, a zero cross detection unit configured to detect a zero cross of the AC voltage, a voltage detection unit configured to detect the AC voltage, a first capacitance element connected across a potential after being subjected to rectification by the rectifying unit and a ground, a first discharging resistor configured to discharge electric charges charged in the first capacitance element, a first switch unit configured to cut off a current flowing to the first discharging resistor and a stopping unit configured, in a case where the AC voltage is detected by the voltage detection unit and the detected voltage is smaller than a threshold value, to stop the operation of the second converter.

According to another aspect of the present invention, a power failure detection apparatus includes a first converter configured to convert a voltage after subjecting an input AC voltage to full-wave rectification, a second converter connected in parallel to the first converter, a zero cross detection unit configured to detect the zero cross of the AC voltage, and a voltage detection unit configured to detect the value of the AC voltage, in which the power failure detection apparatus further includes a stopping unit configured to stop the operation of the second converter if the voltage detected by the voltage detection unit is lower than a threshold value, a first power failure detection unit configured, if the zero cross detection unit cannot detect the zero cross for a predetermined time period or longer, to determine that power failure occurs, and a second power failure detection unit configured, if the voltage detected by the voltage detection unit is lower than the threshold value, to determine that power failure occurs.

According to yet another aspect of the present invention, a power source includes a zero cross detection unit configured to detect the zero cross of an input alternating current (AC) voltage, a first capacitance element connected across the line in which the AC voltage has been rectified and a ground, a first discharging resistor configured to discharge electric charges charged in the first capacitance element, a first switch configured to cut off a current flowing to the first discharging resistor, a second capacitance element connected across two lines to which the AC voltage is supplied, and an input voltage detection unit configured to detect that the input of the AC voltage is cut off, in which the power source further includes a first state where the first switch is in a cutoff state and a second state where the first switch unit is in an energization state, and in which if the input voltage detection unit detects that the AC voltage is cut off, the first switch is in an energization state to discharge electric charges in the second capacitance element.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a control sequence of the power source circuit according to the third exemplary embodiment.

DESCRIPTION OF THE EMBODIMENTS

Various exemplary embodiments, features, and aspects of the invention will be described in detail below with reference to the drawings.

Figure 1:
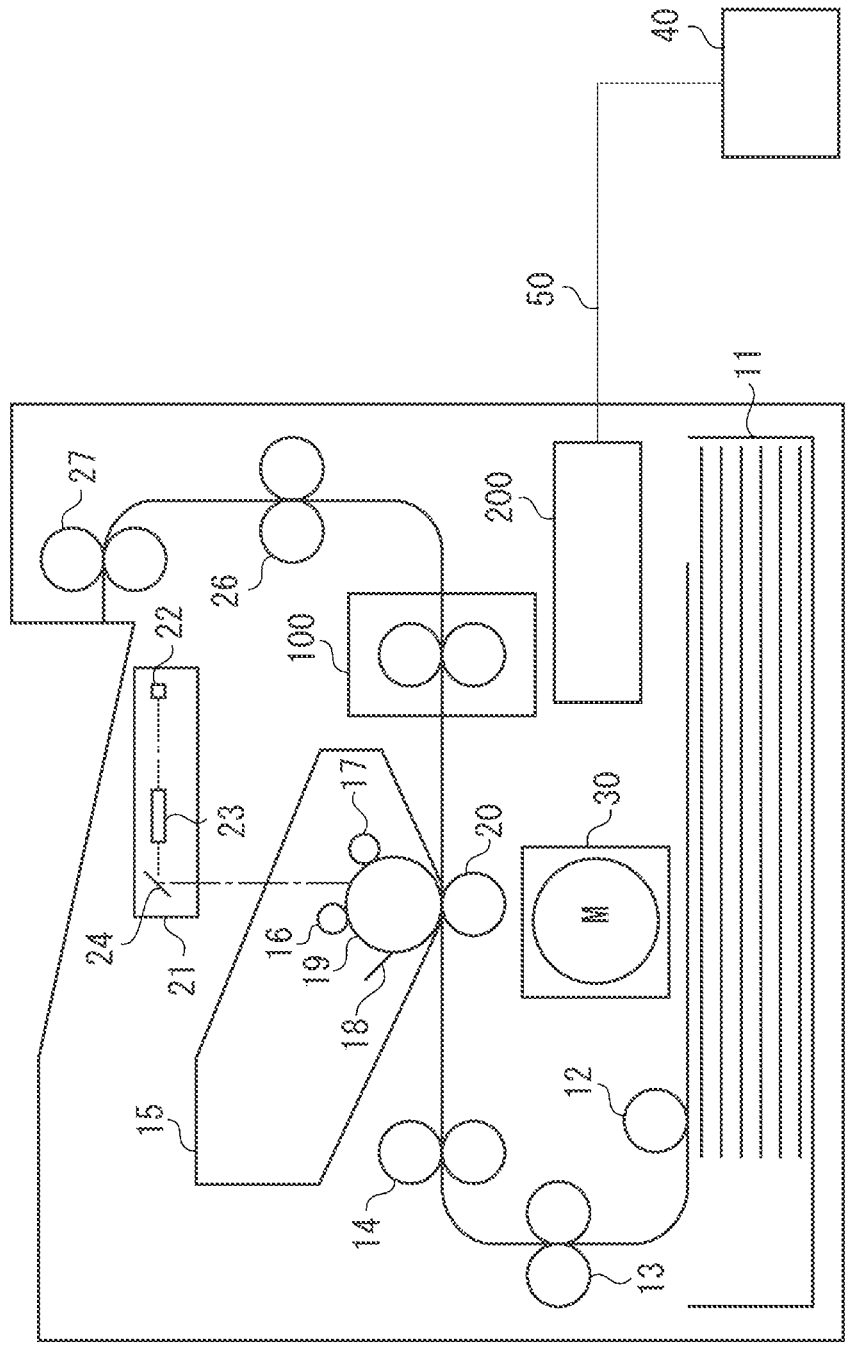
FIG. 1 is a schematic diagram of an image forming apparatus.

Description of Configuration of Apparatus to which the Present Invention is Applied A configuration example according to the present invention will be described. FIG. 1 is a cross section of an electrophotographic image forming apparatus being an example the apparatus to which the present invention is applied. A recording paper being a recording medium stacked on a sheet cassette 11 is sent out by a pickup roller 12 one by one and conveyed to a registration roller 14 by a paper feed roller 13. The recording paper is conveyed by the registration roller 14 to an image forming unit at a predetermined timing. A process cartridge 15 being the image forming unit integrates a charging roller 16 being a charge unit, a development roller 17 being a development unit, a cleaner 18 being a cleaning unit, and a photosensitive drum 19 on which a toner image is formed and is detachable from the image forming apparatus.

An electro-photographic image forming operation is such that the surface of the photosensitive drum 19 is uniformly charged by the charging roller 16 and then a scanner unit 21 being an exposure unit exposes the photosensitive drum 19 based on an image signal. A laser beam emitted from a laser diode 22 in the scanner unit 21 scans in the main scanning direction via a rotating polygon mirror 23 and a reflection mirror 24 and in the sub-scanning direction by the rotation of the photosensitive drum 19 to form a latent image on the surface of the photosensitive drum 19. The latent image on the photosensitive drum 19 is visualized on the photosensitive drum 19 as a toner image by the development roller 17 supplying toner. The toner image on the photosensitive drum 19 is transferred by a transfer roller 20 to the recording paper conveyed from the registration roller 14.

The recording paper to which the toner image is transferred is conveyed to a heating apparatus 100 and subjected to heat and press processing, thereby the toner image transferred to the recoding paper is fixed to the recoding paper. The recoding paper is discharged outside the image forming apparatus by an intermediate discharge roller 26 and a discharge roller 27, and thus a series of image forming operations is completed. Although, the operation of the heating apparatus (fixing unit) 100 is described below, power is controlled by a method for controlling the phase of power to be supplied or a control method across a plurality of cycles including phase control waveforms based on the zero cross timing of the AC voltage supplied from a commercial AC power source. A power source circuit 200 is used in the image forming apparatus. The AC voltage supplied from an external power source unit 40 being a commercial power source is supplied to the power source circuit 200 via a power cable 50.

Figure 2:
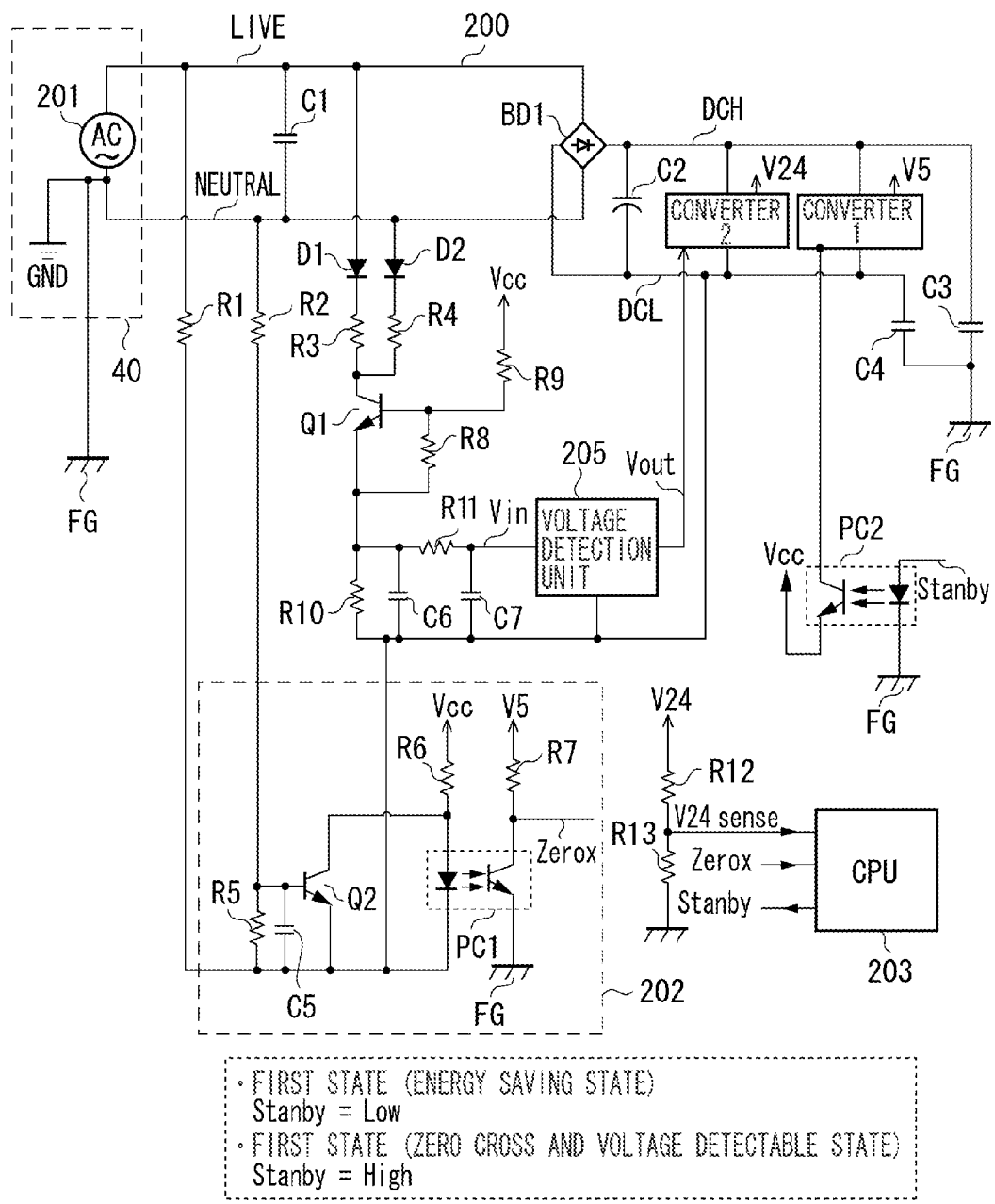
FIG. 2 illustrates a power source circuit according to a first exemplary embodiment.

A first exemplary embodiment will be described. FIG. 2 illustrates the power source circuit 200 according to the first exemplary embodiment. The external power source unit 40 includes a grounding point GND to ground potential and an AC power source 201. The AC power source 201 outputs AC voltage between a LIVE line and a NEUTRAL line. In the present exemplary embodiment, the NEUTRAL line is grounded to the GND in the external power source unit 40. The present exemplary embodiment is effective even in a case where the LIVE line is grounded to the GND. Even in a state in which the frame ground (hereinafter referred to as FG) of the image forming apparatus is not connected to the GND, the detection accuracy of the zero cross can be satisfied. In the present exemplary embodiment, the external power source unit 40 is connected to the power source circuit 200 via three lines of the LIVE line, the NEUTRAL line, and the GND line. The FG of the image forming apparatus is connected to the GND line.

The AC voltage supplied from the AC power source 201 is full-wave rectified by a bridge diode circuit BD1 and smoothened by a primary smoothing capacitor C2. A low potential side of the primary smoothing capacitor C2 is taken as DCL and a high potential side of the primary smoothing capacitor C2 is taken as DCH. In the latter stage of the bridge diode circuit BD1 and the primary smoothing capacitor C2, a first converter (a converter 1) and a second converter (a converter 2) are connected in parallel. The converter 1 is an insulative DC/DC converter, converts a direct current (DC) voltage to be input on a primary side and outputs a DC 5 V (V5) to an output side on a secondary side. The converter 2 is an insulative DC/DC converter, converts a DC voltage to be input on the primary side and outputs a DC 24 V (V24) to the secondary side on the output side.

In general, some power source circuits include a capacitance element (hereinafter referred to an X capacitor) which is used for preventing noise and provided between lines to which the AC voltage is supplied from a commercial AC power source. In a power source circuit using the X capacitor being C1 in FIG. 2, when the user pulls out the power cable supplying power to the power source circuit, the X capacitor sometimes charges electric charges from the AC power source. When the user pulls out the power cable, the user may happen to touch the plug of the power cable by mistake, so that a discharging resistor for discharging electric charges charged in the X capacitor (hereinafter referred to as an X capacitor discharging resistor) is required.

Resistors R1 and R2 are X capacitor discharging resistors used for discharging the X capacitor C1. When the user pulls out the power cable 50 from the external power source unit 40, the external power source unit 40 is cut off from the three lines being the LIVE, NEUTRAL, and GND lines of the power source circuit. If the charging state of the X capacitor C1 is positive (the LIVE side is higher in potential than the NEUTRAL side), electric charges are discharged via the X capacitor discharging resistor R1 and the bridge diode circuit BD1. If the charging state of the X capacitor C1 is negative (the LIVE side is lower in potential than the NEUTRAL side), electric charges are discharged via the X capacitor discharging resistor R2 and the bridge diode circuit BD1.

Japanese Patent Publication No. 4080764 discusses a zero cross detection circuit, a power source circuit including capacitance components between electric potentials (line) after the full-wave rectification of the AC voltage and the frame ground (FG), and a capacitor called a Y capacitor provided between an electric potential after the full-wave rectification and the FG for preventing noise such as terminal noise. A resistor for discharging the Y capacitor (hereinafter referred to as a Y capacitor discharging resistor) is required to accurately detect the timing of the zero cross.

Capacitors C3 and C4 in FIG. 2 are Y capacitors for preventing noise. As described below, even if the Y capacitor C3 does not exist (only the Y capacitor C4 is provided), the effect of the Y capacitor discharging resistor described in the present exemplary embodiment is available. Similarly, even if the Y capacitor C4 does not exist (only the Y capacitor C3 is provided), the effect of the Y capacitor discharging resistor described in the present exemplary embodiment is available. Resistors R3 and R4 are Y capacitor discharging resistors used for discharging the Y capacitors C3 and C4. Diodes D1 and D2 function to prevent reverse flow. The effect of the Y capacitor discharging resistor is described below with reference to FIG. 3. Thus, in the present exemplary embodiment, there are provided the Y capacitor as a first capacitance element, R3 and R4 as a first discharging resistor for discharging the Y capacitor, the X capacitor as a second capacitance element, and R1 and R2 as a second discharging resistor for discharging the X capacitor.

A high-voltage transistor Q1 is a first switching element used for cutting off current flowing into the Y capacitor discharging resistor. In the present exemplary embodiment, a high-voltage bipolar transistor is used as Q1, however, other switching elements such as a field effect transistor (FET) may be used. A resistor R9 is a pull-up resistor for driving the transistor Q1. A resistor R8 serves to protect the transistor Q1. The X capacitor discharging resistors R1 and R2 are resistance elements for discharging electric charges charged in the X capacitor if the user pulls out the power cable 50. The resistors R3 and R4 do not function as resistors for discharging the X capacitor if the transistor Q1 is in off state.

The X capacitor discharging resistors R1 and R2 also have a function to discharge electric charges charged in the Y capacitors C3 and C4. However, the resistance thereof is not smaller enough with respect to the capacitance of the Y capacitors C3 and C4, so that the detection accuracy of the zero cross timing is lowered due to time constant delay (described below in FIG. 3). It is characterized in that the Y capacitor discharging resistors R3 and R4 are set smaller in resistance than at least the X capacitor discharging resistor R2 supplying current to a zero cross detection circuit 202 among the X capacitor discharging resistors R1 and R2. In the configuration of the first exemplary embodiment, the X capacitor discharging resistor R2 acts not only as a zero cross detection resistor for detecting the zero cross timing, but also as the X capacitor discharging resistor. The conditions for the magnitude of a resistance value are given below.

Resistance value of X capacitor discharging resistor (zero cross detection resistor) R2>Resistance value of Y capacitor discharging resistor R3

Resistance value of X capacitor discharging resistor (zero cross detection resistor) R2>Resistance value of Y capacitor discharging resistor R4

A central processing unit (CPU) 203 is a control unit for executing the control of the power source circuit 200 and the image forming apparatus illustrated in FIG. 1. Control using the CPU 203 is described in detail below with reference to a flow chart in FIG. 8.

In FIG. 2, a voltage Vcc is supplied from an auxiliary winding of the converter 1. The auxiliary-winding voltage Vcc is supplied therefrom via a transistor on the primary side of a photo coupler PC2. If the transistor on the primary side of the photo coupler PC2 is insufficient in supply capacity, a transistor for amplifying output may be separately used to output the auxiliary-winding voltage Vcc. When a standby signal output from the CPU 203 (hereinafter referred to as "standby signal") is in a high state, the voltage Vcc is supplied and brought into a high state (the state where the auxiliary-winding voltage Vcc is output). When the standby signal output from the CPU 203 is in a low state, the voltage Vcc is not supplied and brought into a low state (the state where the auxiliary-winding voltage Vcc is equal in potential to the reference potential DCL). The auxiliary-winding voltage Vcc supplies power for driving the zero cross detection unit 202 described below, the converter 2, the transistor Q1 (the first switching element) and a voltage detection unit 205.

The zero cross detection unit 202 is described below. If the NEUTRAL line is higher in potential supplied from the AC power source 201 than the LIVE line, current flows to the zero cross detection unit 202 via the X capacitor discharging resistor R2. If the current supplied from the X capacitor discharging resistor R2 flows to the base terminal of a transistor Q2 of the zero cross detection unit 202, the transistor Q2 becomes on state. A resistor R5 and a capacitor C5 are a circuit for adjusting the operation timing of the transistor Q2.

When the transistor Q2 becomes on state, voltage applied across a diode on the primary side of a photo coupler PC1 is lowered to turn off a transistor on the secondary side of the photo coupler PC1. When the transistor on the secondary side of the photo coupler PC1 becomes off state, the voltage of a zero cross signal (hereinafter referred to as Zerox signal) is increased by the output voltage V5 of the converter 1 via a pull-up resistor R7 and the CPU 203 detects that the Zerox signal is in a high state. If the NEUTRAL line is lower in potential than the LIVE line, current flows via the X capacitor discharging resistor R1 and current does not flow to the X capacitor discharging resistor R2 to turn off the transistor Q2. When the transistor Q2 becomes off state, current flows from the auxiliary-winding voltage Vcc to the diode on the primary side of the photo coupler PC1 via a pull-up resistor R6 to turn on the transistor on the secondary side of the photo coupler PC1. When the transistor on the secondary side of the photo coupler PC1 is becomes on state, the voltage of the Zerox signal is decreased and the CPU 203 detects that the Zerox signal is in a low state. A zero cross waveform is described below with reference to FIG. 3.

The voltage detection unit 205 is described below. Current flowing to the Y capacitor discharging resistors R3 and R4 is charged to a capacitor C6. A resistor R10 discharges the capacitor C6. A voltage Vin smoothed by a resistor R11 and a capacitor C7 is input to the voltage detection unit 205. A decrease in voltage of the AC power source 201 decreases a charge current to the capacitor C6, decreasing the detection voltage Vin of the voltage detection unit 205. If the voltage Vin is not greater than a predetermined threshold voltage value Vth (1.16 V in the present exemplary embodiment), the voltage detection unit 205 brings the Vout into a low state to stop the output of the converter 2. When the output of the converter 2 is stopped to lower the voltage of the V24, the voltage of a signal (V24sense signal) in which the voltage of the V24 is divided by a ratio of the resistances of the resistors R12 and R13 is lowered. The CPU 203 determines by the V24 sense signal that the converter 2 is stopped. A power failure detection method is described in detail below with reference to FIGS. 4 to 7.

The operation of the circuit in FIG. 2 in an energy saving state where the apparatus is not operated is described below. In the energy saving state, the standby signal is in a low state, so that the auxiliary-winding voltage Vcc is also in a low state. Since the Vcc is in the low state, current does not flow to the resistor R6, the diode on the primary side of a photo coupler PC1, and the collector terminal of the transistor Q2 in the zero cross detection unit 202, which allows power consumption to be suppressed. Furthermore, the supply of power to the converter 2 is stopped to stop the switching operation of the converter 2, which allows power consumption to be suppressed. Since the auxiliary-winding voltage Vcc is in the low state, the high-voltage proof transistor Q1 becomes off state. Therefore, current flowing from the LIVE line via the Y capacitor discharging resistor R3 and current flowing from the NEUTRAL line via the Y capacitor discharging resistor R4 are cut off to allow power consumption to be suppressed. In such a state that a power consumption is suppressed, a transistor on the secondary side of the photo coupler PC1 is always in off state to always bring the Zerox signal into a high state (i.e., a state where the zero cross timing cannot be detected). The input voltage to the voltage detection unit 205 is always in a low state (i.e., the voltage from the AC power source cannot be detected).

The operation of the circuit in FIG. 2 in an operation state such as at the time of the standby and the image formation of the apparatus is described below. In such an operation state, the zero cross timing of the AC power source 201 and the input voltage can be detected. In a state where the zero cross timing and the voltage can be detected, the standby signal is in a high state to bring the auxiliary-winding voltage Vcc into a high state. Since the Vcc is in the high state, power for driving the transistor Q1, the zero cross detection unit 202, the voltage detection unit 205, and the converter 2 is supplied. Thereby, current flows to the resistor R6, the diode on the primary side of the photo coupler PC1, and the collector terminal of the transistor Q2 to increase the power consumption of the zero cross detection unit 202. Furthermore, the converter 2 is activated to increase the power consumption of the converter 2. In a state where the auxiliary-winding voltage Vcc is in a high state, the high-voltage transistor Q1 becomes on state to allow the voltage detection unit 205 to detect the voltage of the AC power source 201. Power consumption is increased by current flowing from the LIVE line via the Y capacitor discharging resistor R3 and current flowing from the NEUTRAL line via the Y capacitor discharging resistor R4. In a state where the zero cross timing and the voltage can be detected, the power consumed by the power source circuit 200 is increased.

Thus, the power source circuit 200 according to the present exemplary embodiment is characterized in that the transistor Q1 is turned off to cut off not only current flowing to the Y capacitor discharging resistors R3 and R4 but also current used by the voltage detection unit 205 to detect voltage, thereby reducing power consumption.

Figure 3:
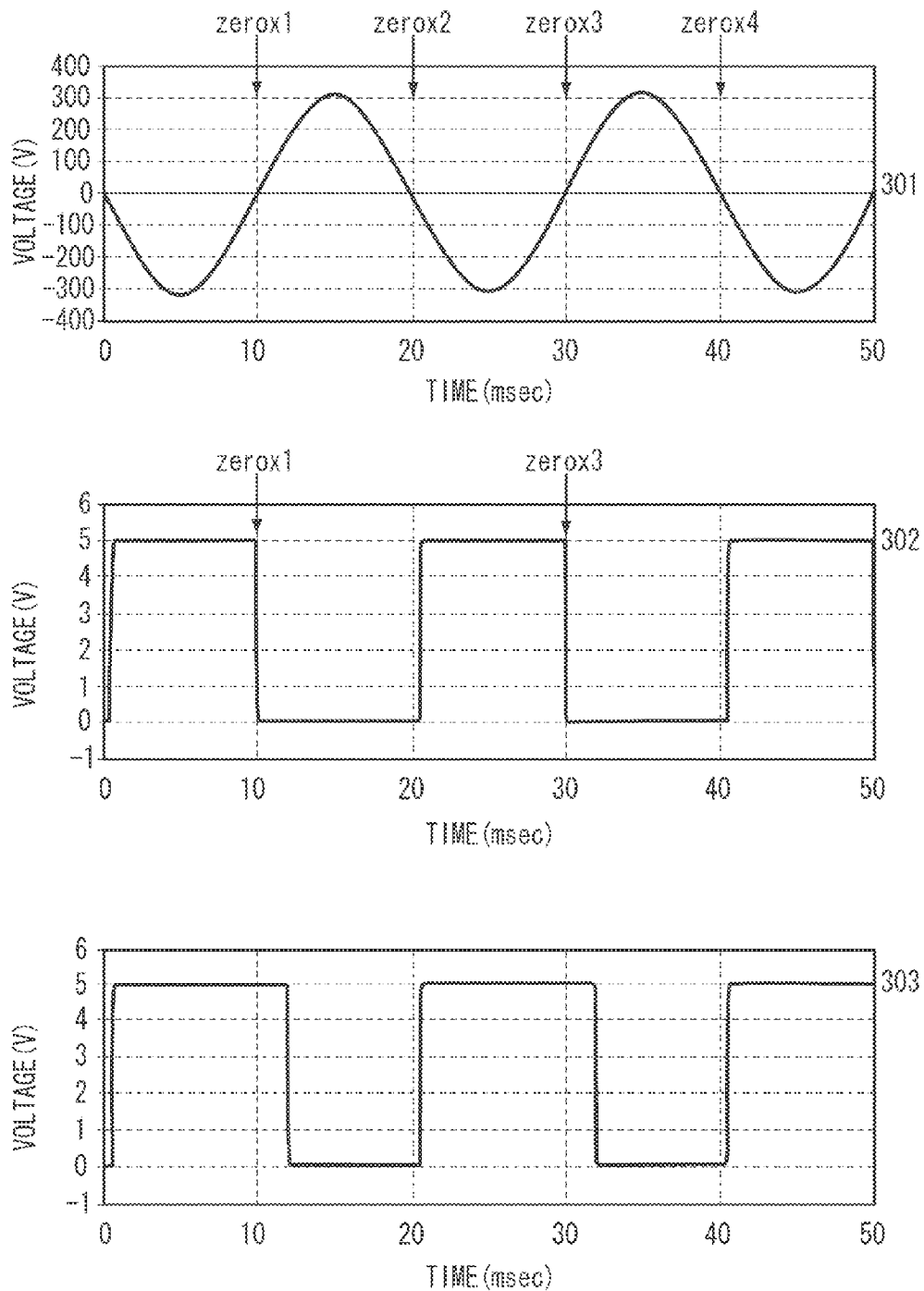
FIG. 3 illustrates a zero cross detection unit according to the first exemplary embodiment.

The effect of the Y capacitor discharging resistors R3 and R4 is described below with reference to FIG. 3. FIG. 3 is a simulation diagram for illustrating the influence of the Y capacitor discharging resistors R3 and R4 according to the present exemplary embodiment on the detection accuracy of the zero cross timing. The waveforms in FIG. 3 illustrate simulation results under the conditions of the X capacitor $C1=0.56\,\mu F$, the Y capacitor $C3=C4=2200\,\mu F$, the X capacitor discharging resistor $R1=R2=1000\,k\Omega$, and the Y capacitor discharging resistor $R3=R4=150\,k\Omega$.

A waveform 301 indicates an AC voltage waveform (220 Vrms, 50 Hz) supplied from the AC power source 201. Zero cross points Zerox 1, Zerox 2, Zerox 3, and Zerox 4 are indicated by arrows above the AC voltage waveform. A waveform 302 indicates a zero cross waveform with the Y capacitor discharging resistors R3 and R4 energized. In the waveform 302, the timing at which the Zerox signal falls agrees with the zero cross Zerox 1 and Zerox 3 of the AC power source 201. The timing of Zerox 2 and Zerox 4 is detected inside the CPU 203. More specifically, a period from Zerox 1 to Zerox 3 (one period of the AC power source 201) is calculated by the CPU 203 (20 msec in the present exemplary embodiment). The CPU 203 estimates the timing after half a period (10 ms in the present exemplary embodiment) from Zerox 1 (3), for example, which is the timing at which the Zerox signal falls, as the timing of Zerox 2 (4). Thus, if either the timing at which the zero cross falls or the timing at which the zero cross rises can be determined, both the zero crosses of rise and fall can be detected and estimated.

A waveform 303 indicates a zero cross waveform (a waveform in a third state described in a third exemplary embodiment) in a state where the Y capacitor discharging resistor is cut off. The timing at which the waveform 303 rises and falls does not agree with the zero cross of the AC power source 201 in the waveform 301. This error is caused by the time taken until the electric charges charged in the Y capacitors C3 and C4 are discharged (CR delay). In a state of the waveform 303, the CR delay due to the X capacitor discharging resistors R1 and R2 and the Y capacitors C3 and C4 causes an error in detecting the zero cross timing. In the waveform 302, the resistance value of the Y capacitor discharging resistors R3 and R4 is small, so that the CR delay caused in the waveform 303 is reduced to allow improving the error in detecting the zero cross timing. The error in detecting the zero cross timing in the state of the waveform 303 is varied depending on the AC voltage supplied from the AC power source 201 and a state where the external power source unit 40 is grounded (GND). For this reason, it is difficult to accurately detect the zero cross timing from the Zerox signal of the waveform 303. In waveform 303, it is possible to detect the cycle (frequency) of the AC voltage supplied from the AC power source 201 indicated in the waveform 301 based on rising or falling timing or the number of times.

Figure 4:
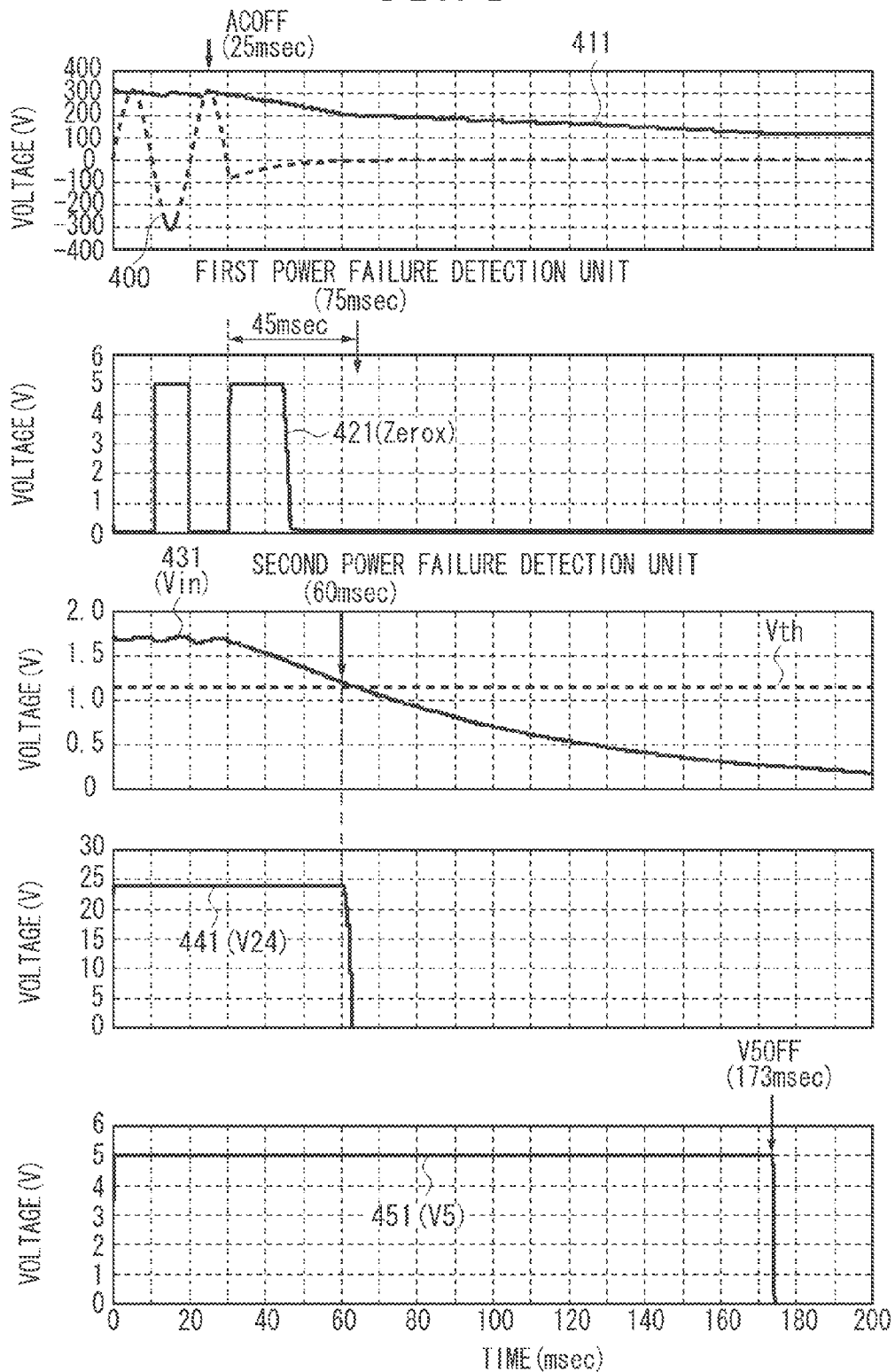
FIG. 4 illustrates diagrams of a power-failure detection operation according to the first exemplary embodiment.

FIG. 4 is a simulation diagram for describing the operation of detecting power failure according to the present exemplary embodiment. The simulation is performed under the conditions that the voltage of the AC power source 201 is 220 Vrms (effective voltage value) the output of the converter 1 is 5 V and 6 A (a constant power load of 30 W), the output of the converter 2 is 24 V and 6 A (a constant power load of 144 W), the conversion efficiency of the converters 1 and 2 is 90%, and the capacitance of the primary smoothing capacitor C2 is 270 µF.

A waveform 400 indicates an input voltage waveform (a voltage between the LIVE terminal and the NEUTRAL terminal) supplied from the AC power source 201. In the present exemplary embodiment, it is presumed that the power cable 50 is pulled out at a timing ACOFF in the figure (30 msec: after one and half a cycle of an AC voltage waveform). It can be seen from the waveform 400 that the electric charges charged in the X capacitor C1 are discharged at the timing when the power cable 50 is pulled out and the voltage is reduced to 0 V after discharge is ended. A waveform 411 indicates a voltage charged in the primary smoothing capacitor C2. A waveform 421 indicates a Zerox signal. An example of a first power failure detection unit using the zero cross detection unit 202 is described below. In the present exemplary embodiment, a method is described which can continuously output V24 and V5 without detecting a power failure state at the time of a instantaneous interruption of one full wave of 20 msec (instantaneous power failure) and detect the power failure state as soon as possible. If the AC power source 201 fails, the zero cross cannot be detected, so that the power failure of the AC power source 201 can be determined. In the present exemplary embodiment, the zero-cross rise and fall at an AC frequency of 50 Hz is detected only for each AC cycle of 20 msec, so that a detection error of 20 msec at maximum is caused. In a case where 5 msec is considered as an error factor for a variation in frequency, a power failure state has only to be detected in a state where the zero cross rise cannot be detected is continued for 45 msec or more (a predetermined time or more) after the zero cross rise is detected last.

It can be seen from the Zerox signal 421 that the zero cross fall is detected a little later after the power failure state occurs. If the power cable 50 is pulled out in a state where negative electric charges are charged in the X capacitor C1, the electric charges in the X capacitor C1 continuously supply base current to the transistor Q2. For this reason, the Zerox signal keeps the high state and is brought into a low state after the X capacitor C1 is discharged to detect the zero cross fall. The timing when the zero cross fall can be detected last depends on the electric charges charged in the X capacitor C1, so that the timing is greatly dispersed. For this reason, the first power failure detection unit according to the present exemplary embodiment detects the power failure state in a state where any one of a time taken until the following rise is detected after the zero cross rise is detected last and a time taken until the following fall is detected after the zero cross fall is detected last reaches 45 msec or more. In a case where the power failure state is detected using the zero cross, as indicated in the waveform 421, the timing when the supply of voltage from the AC power source is cut off (power fails) immediately after the zero cross is detected (timing of ACOFF) is a condition under which it takes the longest time to detect the power failure state using the zero cross. In the example illustrated in FIG. 4, the first power failure detection unit is capable of detecting the power failure state approximately 45 msec after the power failure state occurs at the timing ACOFF.

A second power failure detection unit in the voltage detection unit 205 is described below. A waveform 431 indicates an input voltage Vin of the voltage detection unit 205. The input voltage Vin lowers at the timing ACOFF to stop the operation of the converter 2 at a timing (60 msec) when the input voltage Vin becomes equal to or less than a threshold voltage value Vth. As described above, the voltage detection unit 205 is set to stop the converter 2 30 msec after the power failure occurs not to detect the power failure state at the time of a instantaneous interruption of one full wave of 20 msec. A waveform indicates an output voltage V24 of the converter 2. When the operation of the converter 2 is stopped, the output voltage rapidly decreases. A decrease in the voltage V24 lowers a V24 sense value, in which the voltage of the V24 is divided by a ratio of the resistances of the resistors R12 and R13, to a low state. The CPU 203 can detect the power failure state based on the V24 sense signal. A waveform 451 indicates an output voltage V5 of the converter 1. When the voltage (411) charged in the primary smoothing capacitor C2 is decreased to a limit voltage value or less by which the output voltage of the converter 1 can be held, the converter 1 cannot hold the output voltage V5 any longer. The limit voltage of the converter 1 according to the present exemplary embodiment is taken as 120 V. A timing V5OFF (173 msec) at which the converter 1 cannot hold the output voltage V5 is illustrated.

As illustrated in FIG. 4, the second power failure detection unit is capable of detecting the power failure state approximately 30 msec after the power failure state occurs at the timing ACOFF. An extension time of approximately 113 msec until the converter 1 is stopped after the power failure state is detected can be obtained. The image forming apparatus and the power source circuit have only to be shifted to a state where the image forming apparatus and the power source circuit can be normally stopped using the above extension time. From the example described in FIG. 4, it can be seen that the second power failure detection unit is capable of detecting the power failure state earlier than the first power failure detection unit.

Figure 5:
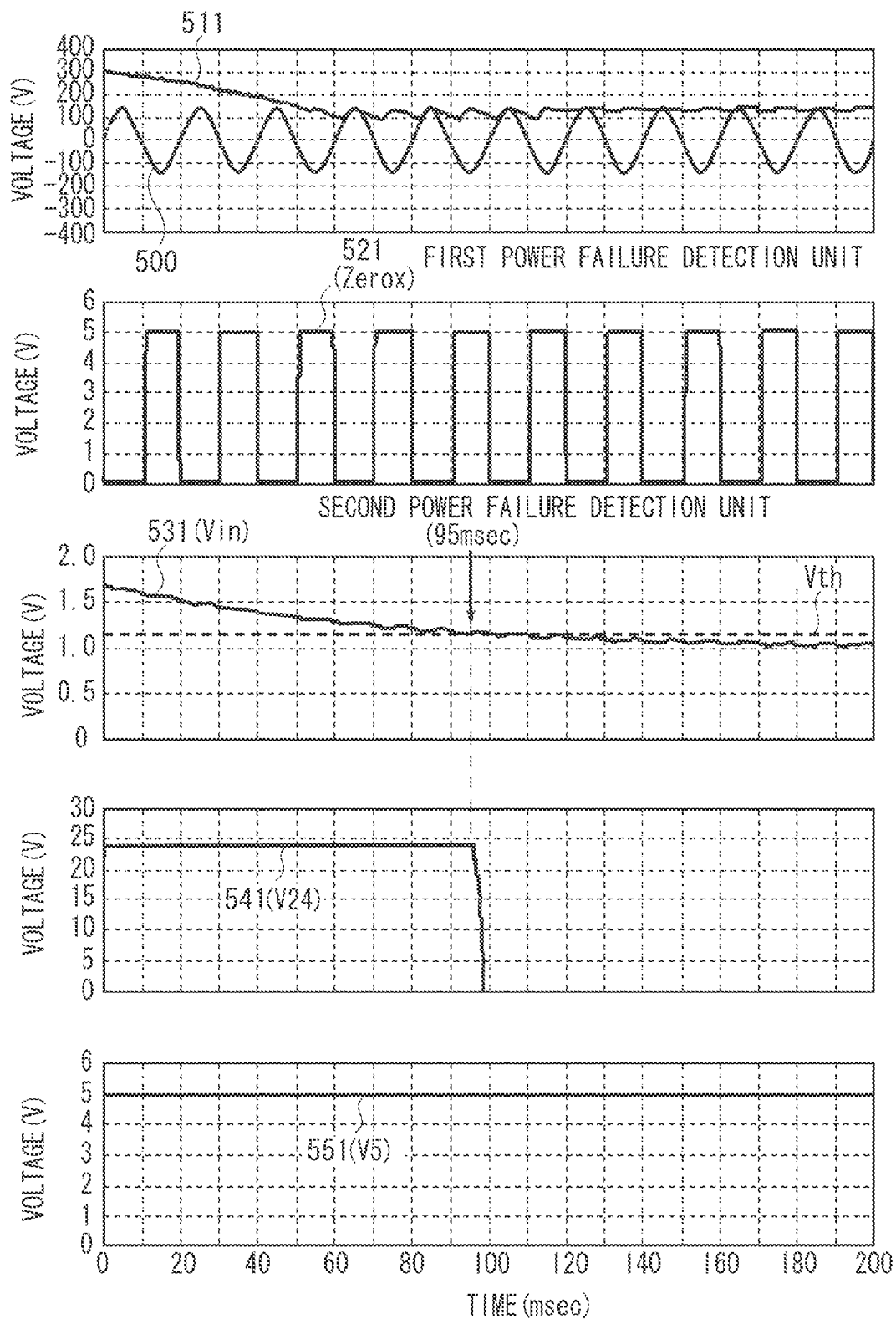
FIG. 5 illustrates diagrams of a power-failure detection operation according to the first exemplary embodiment.

FIG. 5 is a simulation diagram for illustrating the power failure detection unit according to the first exemplary embodiment. The point similar to the simulation described in FIG. 4 is omitted from the description. In the present simulation, the power failure state where the input voltage supplied from the AC power source 201 is lowered from 220 Vrms to 100 Vrms. A waveform 500 indicates an input voltage waveform (a voltage between the LIVE terminal and the NEUTRAL terminal) supplied from the AC power source 201. In the present exemplary embodiment, it is presumed that the power source voltage is lowered from 220 Vrms to 100 Vrms at 0 msec. A waveform 511 indicates a voltage charged in the primary smoothing capacitor C2.

A first power failure detection unit by the zero cross detection unit 202 is described below. A waveform 521 indicates a Zerox signal. Even if the voltage of the AC power source 201 is lowered, the zero cross is not stopped, so that the first power failure detection unit cannot detect a state where the voltage is lowered.

A second power failure detection unit by the voltage detection unit 205 is described below. A waveform 531 indicates the input voltage Vin of the voltage detection unit 205. The input voltage Vin is lowered at the timing when the voltage of the AC power source 201 is lowered and the operation of the converter 2 is stopped at the timing (at 95 msec) when the input voltage Vin is equal to or less than the threshold voltage value Vth. A waveform 541 indicates the voltage value of the output voltage V24 of the converter 2. A waveform 551 indicates the voltage value of the output voltage V5 of the converter 1.

As described above, when the voltage (511) charged in the primary smoothing capacitor C2 is decreased to the limit voltage value of 120 V or less by which the output voltage of the converter 1 can be held, the converter 1 cannot hold the output voltage V5 any longer. As illustrated in FIG. 5, the power failure state can be detected by the second power failure detection unit before the voltage of the primary smoothing capacitor is lowered to 120 V or lower. The image forming apparatus and the power source circuit can be shifted to a state where the image forming apparatus and the power source circuit can be normally stopped before the converter 1 is stopped.

Figure 6:
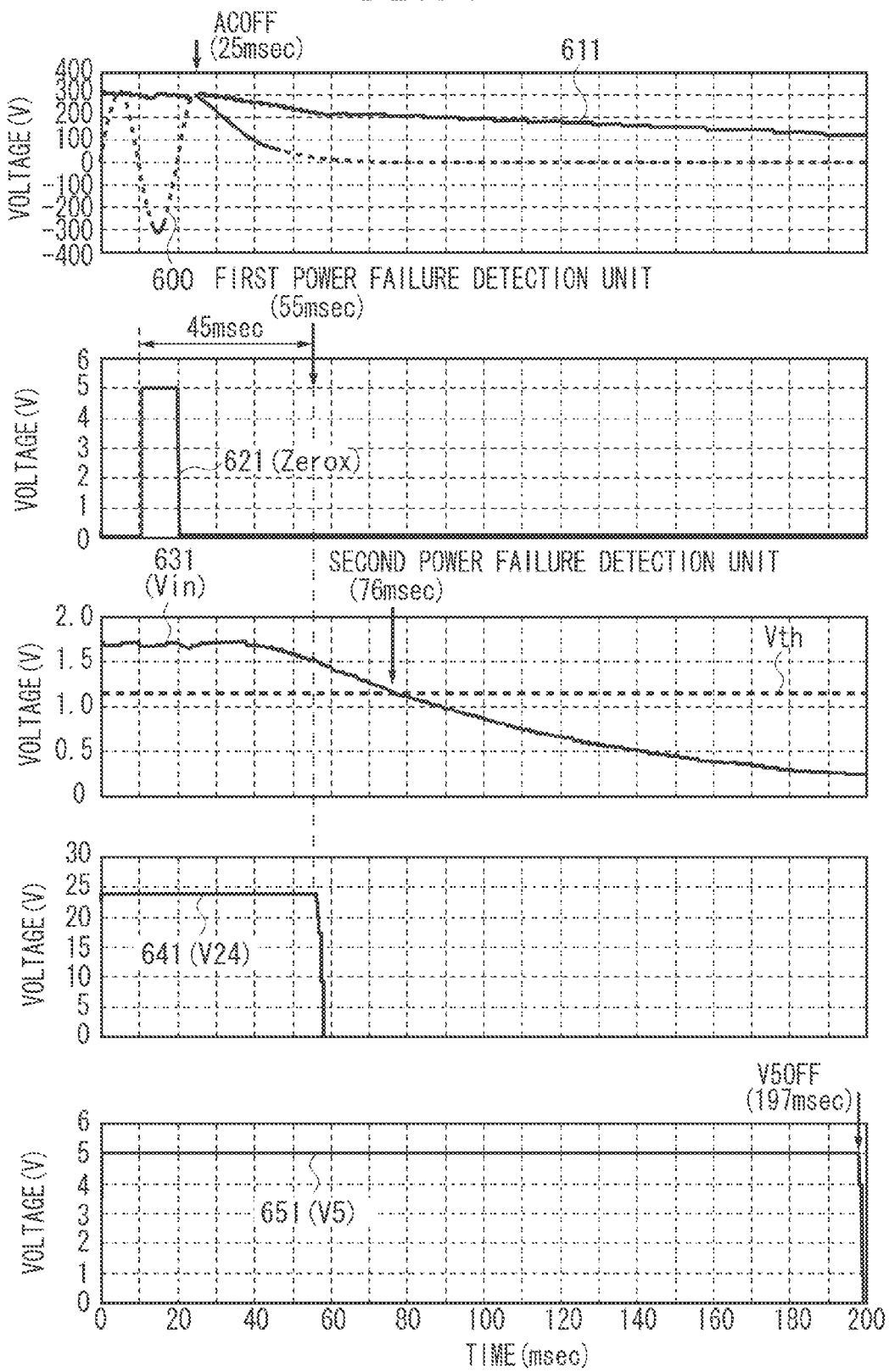
FIG. 6 illustrates diagrams of a power-failure detection operation according to the first exemplary embodiment.

FIG. 6 is a simulation diagram for illustrating the power failure detection unit according to the first exemplary embodiment. The point similar to the simulation described in FIG. 4 is omitted from the description. A waveform 600 indicates an input voltage waveform (a voltage between the LIVE terminal and the NEUTRAL terminal) supplied from the AC power source 201. In the present exemplary embodiment, it is presumed that the power cable 50 is pulled out at a timing ACOFF (25 msec). It can be seen from a waveform 600 that the electric charges charged in the X capacitor C1 start discharging at the timing when the power cable 50 is pulled out and the voltage is reduced to 0 V after discharge is ended. A waveform 611 indicates a voltage charged in the primary smoothing capacitor C2. A waveform 621 indicates the Zerox signal. A first power failure detection unit using the zero cross detection unit 202 is described below. As described in FIG. 4, the power failure state can be detected in a case where a state where the zero cross rise cannot be detected elapses for 45 msec after the zero cross rise is detected last. The first power failure detection unit can detect the power failure state at timing of 55 msec, 30 msec after the power failure occurred at the timing ACOFF (25 msec).

A second power failure detection unit by the voltage detection unit 205 is described below. A waveform 631 indicates the input voltage Vin of the voltage detection unit 205. The comparison of the waveform 631 with the waveform 431 described in FIG. 4 makes it clear that the input voltage Vin starts lowering a litter later after the power failure state occurs. As indicated by the waveform 600, if the power cable 50 is pulled out at the timing when the voltage of the AC power source 201 reaches the peak value thereof, the peak voltage of the AC power source 201 is charged in the X capacitor C1. For this reason, the time required for detecting the power failure state after the voltage of the input voltage Vin indicated by the waveform 631 is lowered to the threshold voltage value Vth or lower is increased as much as the time the voltage of the capacitor C1 is being lowered. In FIG. 6, the time required for the first power failure detection unit detecting the power failure state is 51 msec. A delay time of approximately 21 msec occurs in comparison with the case of FIG. 4.

The delay is attributable to the CR delay which is determined by the capacitance of the X capacitor C1, the X capacitor discharging resistors R1 and R2, and the Y capacitor discharging resistors R3 and R4. In the present exemplary embodiment, the Y capacitor discharging resistors R3 and R4 lower in resistance than the X capacitor discharging resistors R1 and R2 are used to allow the delay time to be decreased in comparison with the case where the Y capacitor discharging resistors are not used. In a case where the power failure state is detected using the voltage detection unit 205, as illustrated in FIG. 6, if the power cable 50 is pulled out at the timing when the voltage of the AC power source 201 reaches the peak value, it takes the longest time to detect the power failure state.

A waveform 641 indicates the voltage of the output voltage V24 of the converter 2. A waveform 651 indicates the voltage of the output voltage V5 of the converter 1. There is illustrated a timing V5OFF (197 msec) when the converter 1 cannot hold the output voltage V5 because a voltage (611) charged in the primary smoothing capacitor C2 is lowered.

As illustrated in FIG. 6, the first power failure detection unit can detect the power failure state approximately 30 msec after the power failure occurs at the timing ACOFF. An extension time of approximately 142 msec until the converter 1 is stopped after the power failure state is detected can be obtained. The image forming apparatus and the power source circuit have only to be shifted to a state where the image forming apparatus and the power source circuit can be normally stopped using the above extension time. From the example described in FIG. 6, it can be seen that the first power failure detection unit is capable of detecting the power failure state earlier than the second power failure detection unit. FIG. 6, however, describes the power failure state attributable to the reason that the power cable 50 is pulled out. In a case where the output of the AC power source 201 is reduced to 0 V, for example, the electric charges of the X capacitor C1 are immediately discharged. For this reason, the above delay time is reduced and even the second power failure detection unit can quickly detect the power failure state.

Figure 7:
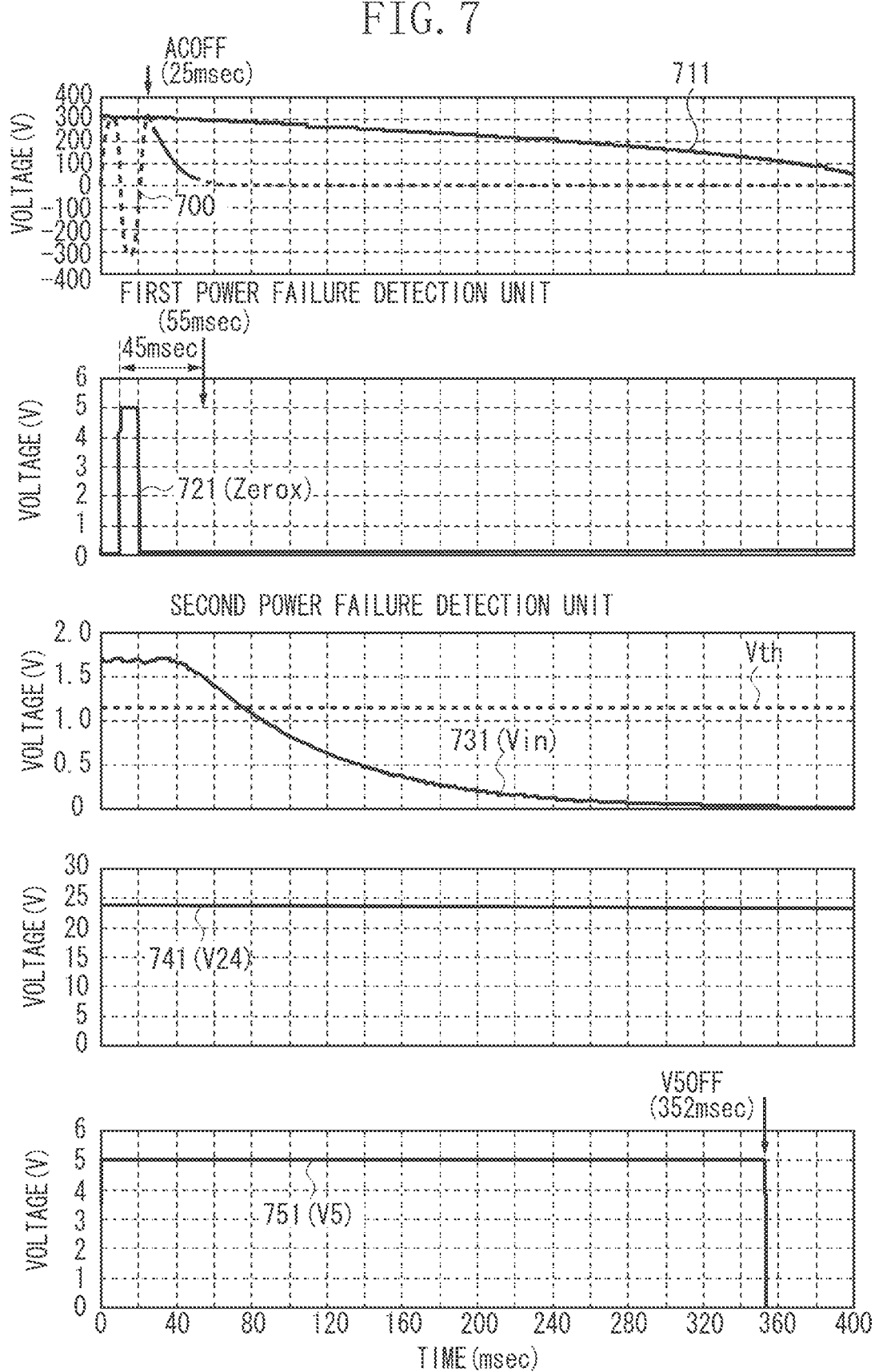
FIG. 7 illustrates diagrams of a power-failure detection operation according to the first exemplary embodiment.

FIG. 7 is a simulation diagram for illustrating the power failure detection unit according to the first exemplary embodiment. The point similar to the simulation described in FIG. 4 is omitted from the description. The simulation describes a case where the output of the converter 1 is 5V and 6 A (a constant power load of 30 W) and the output of the converter 2 is 24 V and 0 A (a constant power load of 0 W), i.e., the power of the output voltage V5 of the converter 1 is large and the power of the output voltage V24 of the converter 2 is very small.

A waveform 700 indicates an input voltage waveform (a voltage between the LIVE terminal and the NEUTRAL terminal) supplied from the AC power source 201. In the present exemplary embodiment, it is presumed that the power cable 50 is pulled out at the timing ACOFF (25 msec). A waveform 711 indicates a voltage charged in the primary smoothing capacitor C2.

A waveform 721 indicates the Zerox signal. The first power failure detection unit using the zero cross detection unit 202 is described below. As described in FIG. 4, the power failure state can be detected in a case where a state where the zero cross rise cannot be detected elapses for 45 msec after the zero cross rise is detected last. The first power failure detection unit can detect the power failure state at timing of 55 msec, 30 msec after the power failure occurred at the timing ACOFF (25 msec).

A second power failure detection unit by the voltage detection unit 205 is described below. A waveform 731 indicates the input voltage Vin of the voltage detection unit 205. If the power of the output voltage V24 of the converter 2 is very small, the output voltage V24 of the converter 2 can be held by a capacitor (not illustrated) even if the converter 2 is stopped by the second power failure detection unit. For this reason, if the power of the output voltage V24 of the converter 2 is very small, the V24sense is kept in a high state, and the CPU 203 sometimes cannot detect the power failure state before the output of the converter 1 is stopped. If a photo coupler PC3 is added, like a power source circuit 900 according to a second exemplary embodiment described below, to directly detect the power failure state, the power failure state can be detected by the second power failure detection unit.

A waveform 741 indicates the output voltage V24 of the converter 2. A waveform 751 indicates the output voltage V5 of the converter 1. There is illustrated a timing V5OFF (352 msec) when the converter 1 cannot hold the output voltage V5 because the voltage 711 charged in the primary smoothing capacitor C2 is lowered.

As illustrated in FIG. 7, the first the power failure detection unit can detect the power failure state approximately 30 msec after the power failure occurs at the timing ACOFF. An extension time of approximately 297 msec until the converter 1 is stopped after the power failure state is detected can be obtained.

Figure 8:
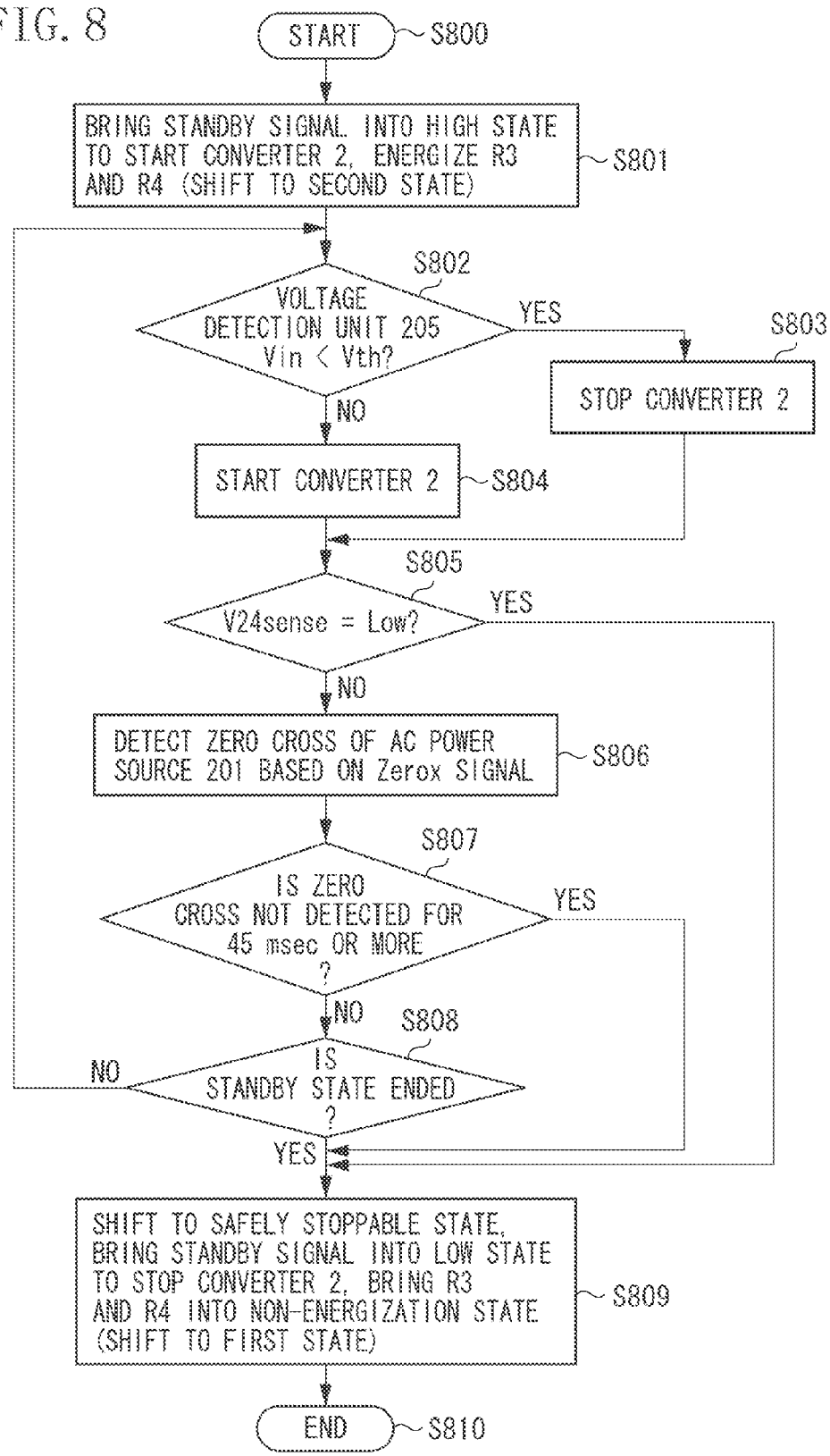
FIG. 8 is a flow chart illustrating the control sequence of the power source circuit according to the first exemplary embodiment.

FIG. 8 is a flow chart illustrating the control sequence of the power source circuit 200 controlled by the CPU 203 according to the first exemplary embodiment. In step S800, control is started and processing proceeds to step S801. In step S801, the standby signal is brought into a high state to supply power to the converter 2, the zero cross detection circuit 202, and the voltage detection unit 205, and energize the Y capacitor discharging resistors R3 and R4 (this is a second state where the zero cross and voltage can be detected).

In step S802, the CPU 203 determines whether the input voltage Vin of the voltage detection unit 205 is smaller than the threshold voltage value Vth. If the input voltage Vin is lower than the threshold voltage value Vth (YES in step S802), the processing proceeds to step S803. In step S803, the converter 2 is stopped. If the input voltage Vin is higher than the threshold voltage value Vth (NO in step S802), the processing proceeds to step S804. In step S804, the converter 2 is started. If the converter 2 is already started, the converter 2 is kept operating.

In step S805, the CPU 203 determines a power failure state based on the V24sense signal. If the V24sense signal is brought into a low state (YES in step S805), the CPU 203 detects the power failure state. The processing proceeds to step S809. If NO in step S805, in step S806, the zero cross of the AC power source 201 is detected based on the fall timing of the Zerox signal.

In step S807, if the CPU 203 cannot detect the rise or the fall of the Zerox signal for 45 msec or longer, the processing proceeds to step S809 to detect the power failure state. The present exemplary embodiment describes a case where both of the rise and the fall of the Zerox signal are detected, however, the present exemplary embodiment is also effective for a case where the power failure state is detected by any one of the rise and the fall of the Zerox signal.

If the power failure state is detected in steps S805 and S807, in step S809, the standby signal is brought into a low state to cut off the supply of power to the converter 2, the zero cross detection circuit 202, and the voltage detection unit 205, bringing the capacitor discharging resistors R3 and R4 into a cut-off state (this is a first state and an energy saving state). The first state is the one that the power source can be normally stopped even if the AC power source 201 has power failure. For example, if the image forming apparatus according to the present exemplary embodiment has a hard disk (not illustrated), the CPU 203 performs a processing for avoiding data crash. In step S808, the above processing is repeated until it is determined that the standby state is ended. After the processing in step S809 is ended, in step S810, control is ended.

The effect of providing the first power failure detection unit using the zero cross detection unit 202 and the second power failure detection unit using the voltage detection unit 205 is described below. As described in FIG. 4, if the power cable 50 is pulled out immediately after the zero cross is detected, it takes the longest time for the first power failure detection unit to detect the power failure state and the second power failure detection unit can detect the power failure state earlier than the first power failure detection unit. As described in FIG. 6, if the power cable 50 is pulled out at the timing when the voltage of the AC power source 201 reaches the peak value, it takes the longest time for the second power failure detection unit to detect the power failure state and the first power failure detection unit can detect the power failure state earlier than the second power failure detection unit. The use of the first power failure detection unit and the second power failure detection unit allows quickly detecting the power failure state even if the timing when the power cable 50 is pulled out is changed. As described in FIG. 5, if the voltage of the AC power source 201 is significantly lowered, the power failure state can be detected by the second power failure detection unit. As described in FIG. 7, if the power of the output voltage V5 of the converter 1 is large, and that of the output voltage V24 of the converter 2 is very small, the power failure state can be detected by the first power failure detection unit.

The use of the first power failure detection unit using the zero cross detection unit 202 and the second power failure detection unit using the voltage detection unit 205 allows accurately detecting the power failure state with a simple configuration. In the power source circuit 200 according to the present exemplary embodiment, the first switching element Q1 is used as a unit for cutting off current flowing to the Y capacitor discharging resistors R3 and R4 and a unit for cutting off current required for detecting the voltage of the voltage detection unit 205 to allow only one high-voltage switching element Q1 to switch between a state where the zero cross and the power-failure voltage can be detected and a state where the power consumption can be reduced.

According to the present exemplary embodiment, the power failure state can be quickly detected with a simple configuration and power consumption in the standby state of the apparatus can be reduced.

Figure 9:
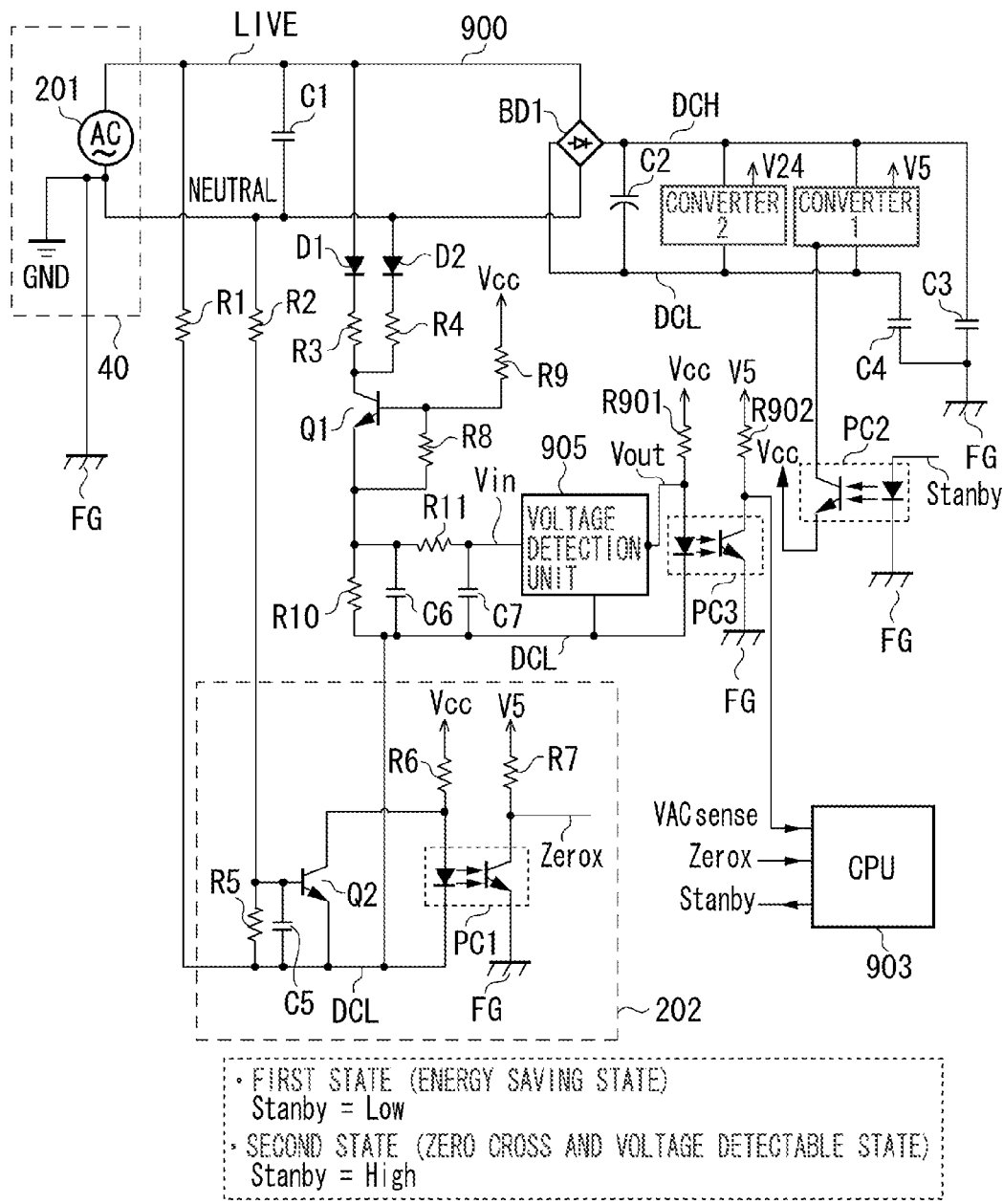
FIG. 9 illustrates the power source circuit according to a second exemplary embodiment.

A second exemplary embodiment will be described. The power source circuit 900 including a voltage detection unit 905 according to a second exemplary embodiment is described below with reference to FIG. 9. A configuration similar to the one in the first exemplary embodiment is omitted from the description.

Unlike the first exemplary embodiment, the second exemplary embodiment requires the photo coupler PC3. If the power of the output voltage V5 of the converter 1 is large, and that of the output voltage V24 of the converter 2 is small as described in FIG. 7, the power failure state can be detected by the voltage detection unit 905.

The operation of the voltage detection unit 905 according to the present exemplary embodiment is described below. If the input voltage Vin is equal to or less than the predetermined threshold voltage value Vth (1.16V in the present exemplary embodiment), the voltage detection unit 905 brings Vout into a low state to preclude current from flowing to the diode on the primary side of the photo coupler PC3. Pull-up resistors R901 and R902 are provided. If current does not flow to the diode on the primary side of the photo coupler PC3, the transistor on the secondary side of the photo coupler PC3 is turned off to bring a VACsense signal into a high state, allowing the CPU 203 to detect the power failure state.

According to the present exemplary embodiment, the power failure state can be quickly detected with a simple configuration and power consumption in the standby state of the apparatus can be reduced.

Figure 10:
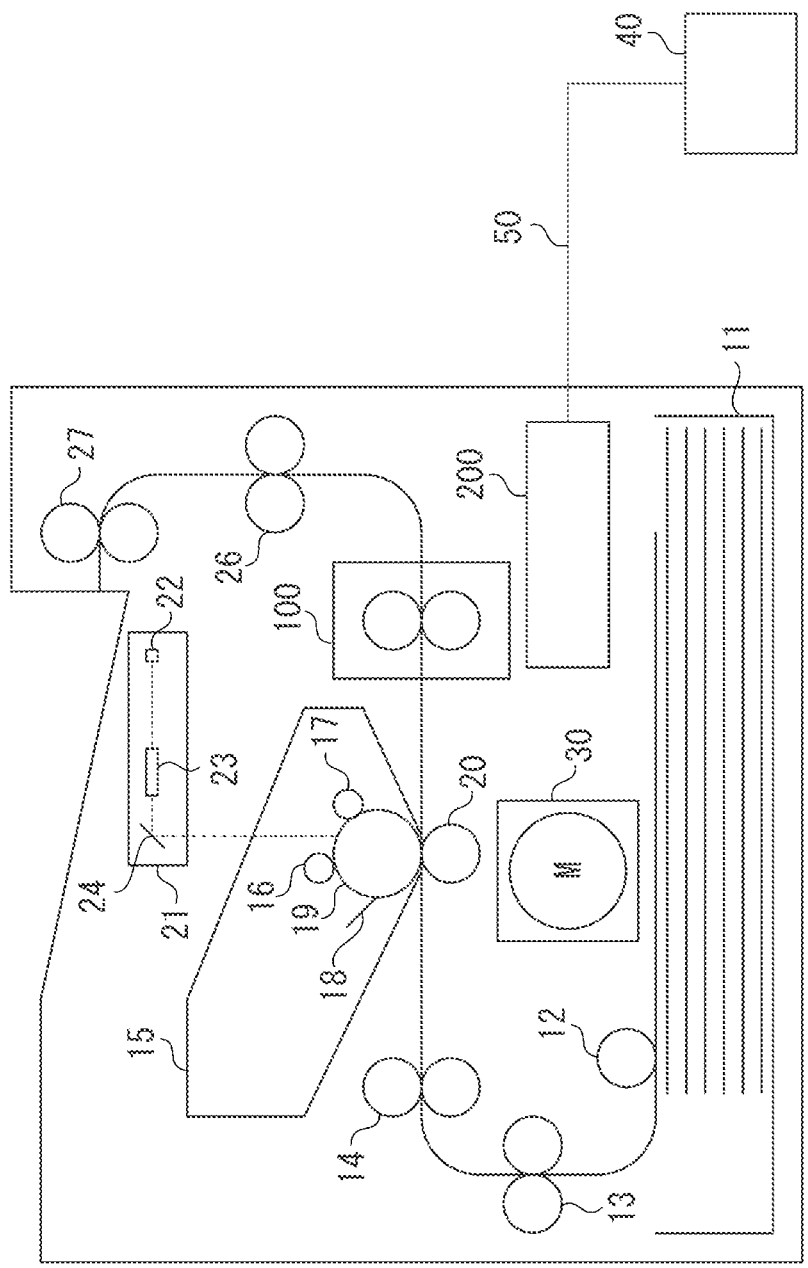
FIG. 10 is a schematic diagram of the image forming apparatus used in the third to eighth exemplary embodiments.

The following describes an example of an apparatus applied to a third to an eight exemplary embodiment described below. An example of an apparatus to be applied is described below. FIG. 10 is a cross section of an image forming apparatus using an electro-photographic recording technique. Only one recording paper being a recording medium stacked on a sheet cassette 11 is sent out by a pickup roller 12 and conveyed to a registration roller 14 by a paper feed roller 13. The recording paper is conveyed by the registration roller 14 to a process cartridge 15 at a predetermined timing. The process cartridge 15 integrates a charge unit 16, a development roller 17 being a development unit, a cleaner 18 being a cleaning unit, and a photosensitive drum 19 being an electro-photographic photosensitive member. A toner image yet to be fixed is formed on the recording paper by a series of processing of a heretofore known electro-photographic process.

The surface of the photosensitive drum 19 is uniformly charged by the charge unit 16 and then subjected to image exposure based on an image signal by a scanner unit 21 being an image exposure unit. A laser beam emitted from a laser diode 22 in the scanner unit 21 scans in the main scanning direction via a rotating polygon mirror 23 and a reflection mirror 24 and in the sub-scanning direction by the rotation of the photosensitive drum 19 to form a two dimensional latent image on the surface of the photosensitive drum 19. The latent image on the photosensitive drum 19 is visualized as a toner image by the development roller 17 supplying toner. The toner image is transferred by a transfer roller 20 to the recording paper conveyed from the registration roller 14. The recording paper to which the toner image is transferred is conveyed to an image heating apparatus 100 and subjected to heat and press processing, thereby the toner image yet to be fixed on the recording paper is fixed to the recoding paper. The recoding paper is discharged outside the image forming apparatus by an intermediate discharge roller 26 and a discharge roller 27 and a series of print operations is ended. A motor 30 provides driving force for each unit including the heating apparatus (image heating apparatus) 100.

The heating apparatus (fixing unit) 100 includes an endless belt, a ceramic heater being contact with the inner surface of the endless belt, and a pressure roller forming a fixing nip portion with the ceramic heater via the endless belt. A power control unit for the heating apparatus (fixing unit) 100 controls the phase of the power (AC voltage) input from the AC power source being a commercial power source using a switching element. The phase of an AC waveform supplied from the AC power source is controlled based on the timing when the AC power source becomes 0 V (hereinafter referred to as zero cross), which is a reference of the phase control, and the power control unit executes the phase control. A power source circuit 200 is used in the image forming apparatus. The AC power source supplied from an external power source unit 40 being a commercial power source is connected to the power source circuit 200 via a power cable 50.

The present invention is characterized in that a circuit is configured so that the Y capacitor discharging resistor in the power source unit doubles as the zero cross detection resistor for detecting the zero cross to realize a circuit for discharging the X capacitor with a simple configuration. The characterizing portion of the present invention is described in detail below based on the exemplary embodiment.

Figure 11A:
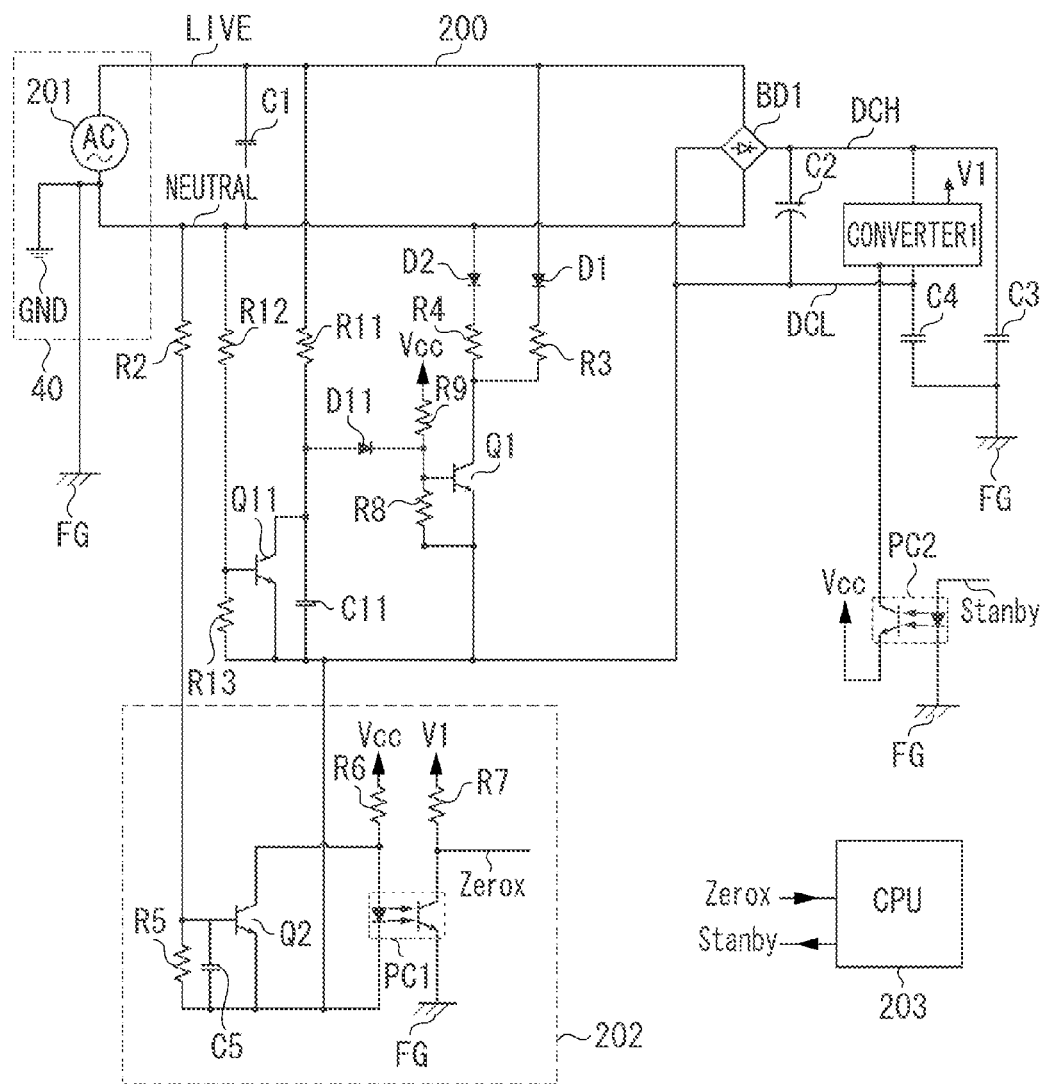
FIG. 11A is a diagram of a power source circuit according to a third exemplary embodiment.
Figure 11B:
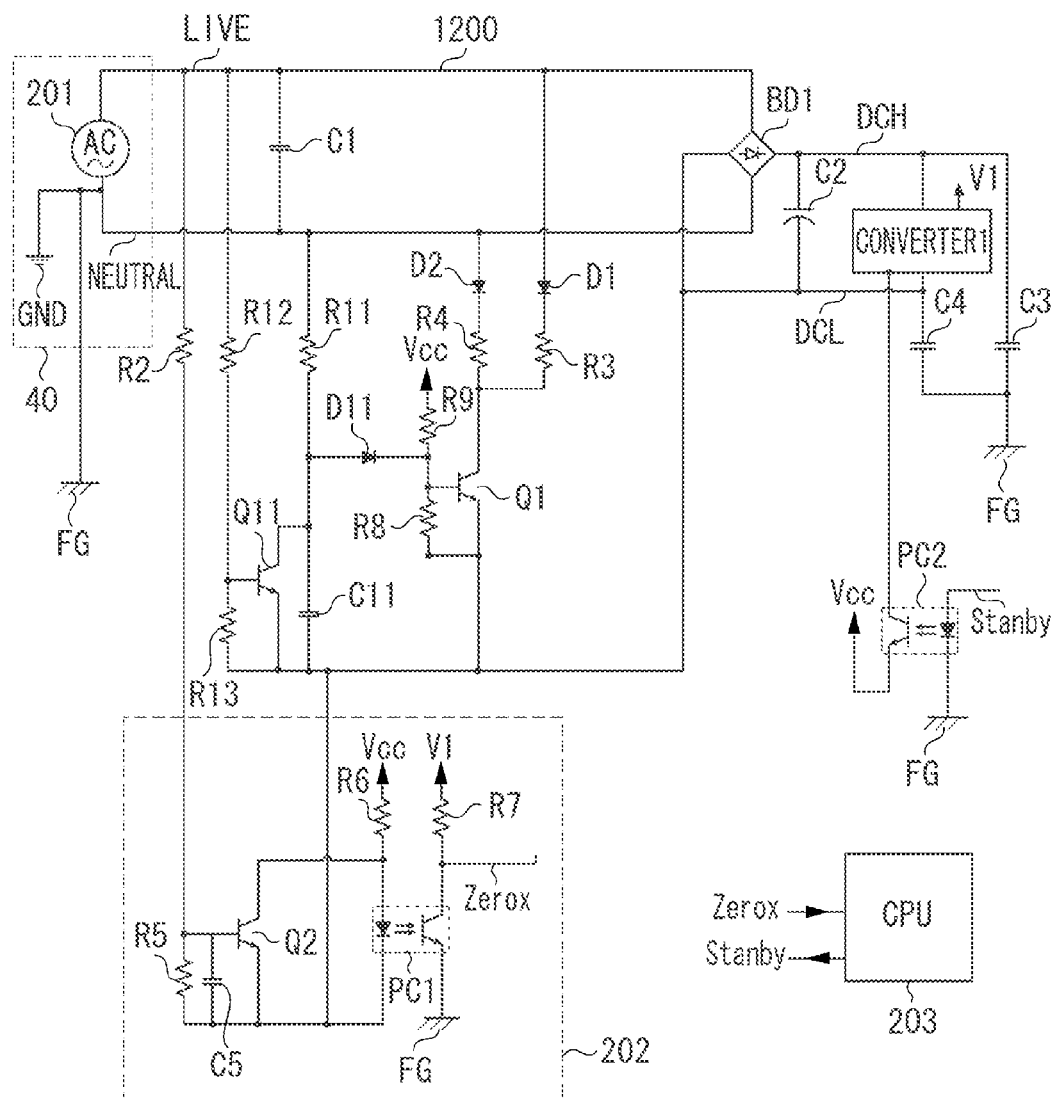
FIG. 11B is a diagram of a power source circuit according to the third exemplary embodiment.

A third exemplary embodiment will be described. FIG. 11A illustrates a power source unit 200 including a power failure detection unit according to a third exemplary embodiment. FIG. 11B is a modification example according to the present exemplary embodiment described below. An external power source unit 40 includes a grounding point (hereinafter referred to as GND) to ground potential and an AC power source 201. The AC power source 201 outputs AC voltage between a LIVE line and a NEUTRAL line. The present exemplary embodiment describes an example in which the NEUTRAL line is grounded to the GND in the external power source unit 40. The present exemplary embodiment is effective even in a case where the LIVE line is grounded to the GND. Even in a state in which the frame ground (hereinafter referred to as FG) of the image forming apparatus is not connected to the GND, the detection accuracy of the zero cross can be satisfied. In the present exemplary embodiment, the external power source unit 40 is connected to the power source circuit 200 via three lines of the LIVE line, the NEUTRAL line, and the GND line. The FG of the image forming apparatus is connected to the GND line. The AC voltage supplied from the AC power source 201 is full-wave rectified by a bridge diode circuit BD1 and smoothened by a primary smoothing capacitor C2. A low potential side of the primary smoothing capacitor C2 is taken as DCL and a high potential side of the primary smoothing capacitor C2 is taken as DCH.

In the latter stage where the full-wave rectification is performed by the bridge diode circuit BD1 and the primary smoothing capacitor C2, a first converter 1 is connected. The converter 1 is an insulative DC/DC converter and outputs a DC voltage V1 to the secondary side from the DC voltage on the primary side.

A zero cross detection unit 202 is described below. If the NEUTRAL line is higher in potential supplied from the AC power source 201 than the LIVE line, current flows to the zero cross detection unit 202 via the X capacitor discharging resistor R2 acting as a second discharging resistor for discharging the X capacitor C1 being a second capacitance element. If the current supplied from the X capacitor discharging resistor R2 flows to the base terminal of a transistor Q2 of the zero cross detection unit 202, the transistor Q2 becomes on state. A resistor R5 and a capacitor C5 are used to adjust the operation timing of the transistor Q2. When the transistor Q2 becomes on state, voltage applied across a diode on the primary side of a photo coupler PC1 is lowered to turn off a transistor on the secondary side of the photo coupler PC1. When the transistor on the secondary side of the photo coupler PC1 becomes off state, the voltage of a zero cross signal is increased by the output voltage V1 of the converter 1 via a pull-up resistor R7 and the CPU 203 detects that the Zerox signal is in a high state. If the NEUTRAL line is lower in potential than the LIVE line, current does not flow to the X capacitor discharging resistor R2 to turn off the transistor Q2. When the transistor Q2 becomes off state, current flows from the auxiliary-winding voltage Vcc described below to the diode on the primary side of the photo coupler PC1 via a pull-up resistor R6 to turn on the transistor on the secondary side of the photo coupler PC1. When the transistor on the secondary side of the photo coupler PC1 becomes on state, the voltage of the Zerox signal is decreased and the CPU 203 detects that the Zerox signal is in a low state. A zero cross waveform is described below with reference to FIG. 12.

As discussed in Japanese Patent Application Laid-Open No. 2003-199343, a first discharging resistor for discharging the Y capacitor (hereinafter referred to as a Y capacitor discharging resistor) is required for accurately detecting the zero cross in a power source circuit including a zero cross detection unit and a first capacitance element between the electric potential after the full-wave rectification of the AC power source and the FG (hereinafter referred to as a Y capacitor). Capacitors C3 and C4 in FIG. 2 are Y capacitors for preventing noise. As described below, even if the Y capacitor C3 does not exist (only the Y capacitor C4 is provided), the effect of the Y capacitor discharging resistor described in the present exemplary embodiment is available. Similarly, even if the Y capacitor C4 does not exist (only the Y capacitor C3 is provided), the effect of the Y capacitor discharging resistor described in the present exemplary embodiment is available. Resistors R3 and R4 are Y capacitor discharging resistors used for discharging the Y capacitors C3 and C4. Diodes D1 and D2 function to prevent reverse flow. The effect of the Y capacitor discharging resistor is described below with reference to FIG. 12. A high-voltage transistor Q1 is a first switching element used for cutting off current flowing to the Y capacitor discharging resistor. In the present exemplary embodiment, a high-voltage proof bipolar transistor is used as Q1, however, other switching elements such as a field effect transistor (FET) may be used. A resistor R9 is a pull-up resistor for driving the transistor Q1. A resistor R8 serves to protect the transistor Q1.

The X capacitor discharging resistor R2 also has a function to discharge electric charges charged in the Y capacitors C3 and C4. However, the resistance thereof is not smaller enough with respect to the capacitance of the Y capacitors C3 and C4, so that the detection accuracy of the zero cross timing is lowered due to the CR delay as described in FIG. 12. It is characterized in that the Y capacitor discharging resistors R3 and R4 are set smaller in resistance than at least the X capacitor discharging resistor R2 supplying current to the zero cross detection circuit 202 among the X capacitor discharging resistors. In the configuration of the present exemplary embodiment, resistor R2 doubles as a zero cross detection resistor and the X capacitor discharging resistor.

Resistance value of X capacitor discharging resistor (zero cross detection resistor) R2>Resistance value of Y capacitor discharging resistor R3

Resistance value of X capacitor discharging resistor (zero cross detection resistor) R2>Resistance value of Y capacitor discharging resistor R4

Figure 19:
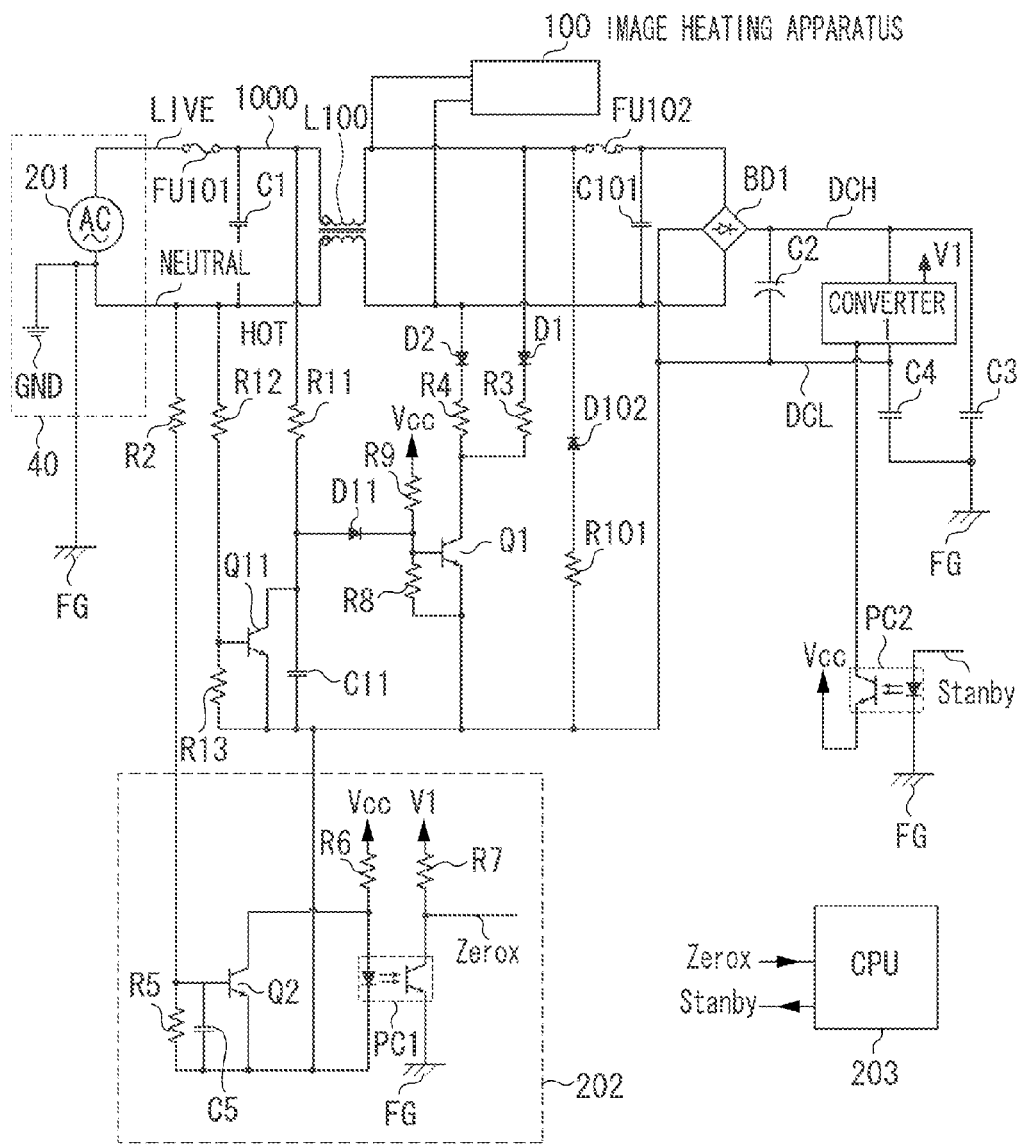
FIG. 19 is a diagram of a power source circuit according to a seventh exemplary embodiment.

A CPU 203 is used to control the power source circuit 200 and the image forming apparatus illustrated in FIG. 19. Control using the CPU 203 is described in detail below with reference to a flow chart in FIG. 14.

A method for discharging the X capacitor C1 if the power cable 50 is pulled out is described below. If the charging state of the X capacitor C1 is positive (the LIVE side is higher in potential than the NEUTRAL side), a state where the power cable is pulled out is detected by a power-cable pulling-out detection unit (an input voltage detection unit for detecting that the input of AC voltage is cut off) described below to turn on the transistor Q1, discharging the electric charges in the X capacitor C1 via the Y capacitor discharging resistor R3 and the BD1 (hereinafter referred to as a first discharge path). The power-cable pulling-out detection unit is formed of the charging resistor R11, the charging capacitor C11, and the discharge unit of the charging capacitor C11. In the power source circuit 200, the discharge unit of the charging capacitor C11 includes resistors 12 and 13 and a transistor Q11. If the charging state of the X capacitor C1 is negative, (the LIVE side is lower in potential than the NEUTRAL side), the transistor Q1 becomes on state via the resistor R12 to discharge the charging capacitor C11. The resistor R13 is a protection resistor of the transistor Q11. The charging capacitor C11 repeats a half-cycle (a first cycle) charged by the charging resistor R11 and a half-cycle (a second cycle) discharged by the discharge unit of the charging capacitor C11 (the resistor R12, the resister R13 and the transistor Q11) for each half a period of the AC voltage supplied from the AC power source 201. In a case where the AC voltage is supplied from the AC power source 201, the charge and discharge are repeated, so that the voltage of the charging capacitor C11 is held low. If the power cable 50 is pulled out and the charging state of the X capacitor C1 is positive (the LIVE side is higher in potential than the NEUTRAL side), charge current flows from the X capacitor C1 to the charging capacitor C11 via the charging resistor R11. If the voltage of the charging capacitor C11 increases and exceeds a predetermined threshold value, the transistor Q1 (a first switching element) is turned on. Thus, the power source circuit 200 according to the present exemplary embodiment is characterized in that, if the power cable is pulled out, the transistor Q1 is turned on using the power-cable pulling-out detection unit, thereby using the Y capacitor discharging resistor R3 as the discharge path of the X capacitor. Since discharge is performed only in a case where the power cable 50 is pulled out, power consumption in the first discharge path can be suppressed in a state where the AC voltage is supplied from the AC power source 201.

If the charging state of the X capacitor C1 is negative, (the LIVE side is lower in potential than the NEUTRAL side), the electric charges of the X capacitor C1 are discharged via the X capacitor discharging resistor R2 and the bridge diode circuit BD1 (hereinafter referred to as a second discharge path). Like the second discharge path, if the discharging resistor that is always turned on is used, power is always consumed by the discharge current of the X capacitor. For the total power consumption in the first discharge path and the second discharge path of the power source circuit 200, power consumption in the first discharge path can be reduced to substantially zero, so that power consumption due to the discharge current of the X capacitor can be substantially halved as compared with the case where the discharging resistor that is always turned on is used for both of the first discharge path and the second discharge path.

A voltage Vcc of the power source circuit 200 is the one that is supplied from an auxiliary winding (not illustrated) of the converter 1. The auxiliary-winding voltage Vcc is supplied via a transistor on the primary side of a photo coupler PC2. When a standby signal output from the CPU 203 is in a high state, power is supplied to the voltage Vcc, so that the Vcc is brought into a high state (the state where the auxiliary-winding voltage Vcc is output). When the standby signal output from the CPU 203 is in a low state, power is not supplied to the Vcc, so that the Vcc is brought into a low state (the state where the Vcc is equal in potential to the reference potential DCL). The auxiliary-winding voltage Vcc supplies power for driving the zero cross detection unit 202 and the transistor Q1 (the first switching element).

The operation of a circuit in an energy saving state where power consumption is suppressed (the state where power consumption is low and is referred to a first state) such as a power-source OFF state and a sleep state is described below. Since the standby signal is in a low state in the energy saving state, the auxiliary-winding voltage Vcc is brought into a low state. Since the Vcc is brought in a low state, current does not flow to a resistor R6 of the zero cross detection circuit 202, a diode on the primary side of the photo coupler PC1, and the collector terminal of the transistor Q2 to allow suppressing power consumption. The auxiliary-winding voltage Vcc is in a low state, so that the high-voltage transistor Q1 is in off state. Therefore, current flowing from the LIVE line via the resistor R3 and current from the NEURAL line via the resistor R4 can be cut off to suppress power consumption. In the state where the power consumption is suppressed, the transistor on the secondary side of the photo coupler PC1 is always in off state, so that the zerox signal is always brought into a high state (a state where the zero cross cannot be detected).

The operation of a circuit in a state where the zero cross of the AC power source 201 can be detected (a second state) such as a standby state and a printing state of the image forming apparatus is described below. In the state where the zero cross can be detected, the standby signal is in a high state, so that the auxiliary-winding voltage Vcc is brought into a high state. Since the auxiliary-winding voltage Vcc is in a high state, so that power for driving the transistor Q1 and the zero cross detection circuit 202 is supplied. Current flows to the resistor R6, the diode on the primary side of the photo coupler PC1, and the collector terminal of the transistor Q2 to increase the power consumption of the zero cross detection circuit 202. If the auxiliary-winding voltage Vcc is in a high state, the high-voltage transistor Q1 is in on state to increase power consumption by current flowing from the LIVE line via the resistor R3 and current from the NEURAL line via the resistor R4. In the state where the zero cross can be detected (in the second state), power consumed in the power source circuit 200 is increased.

Figure 12:
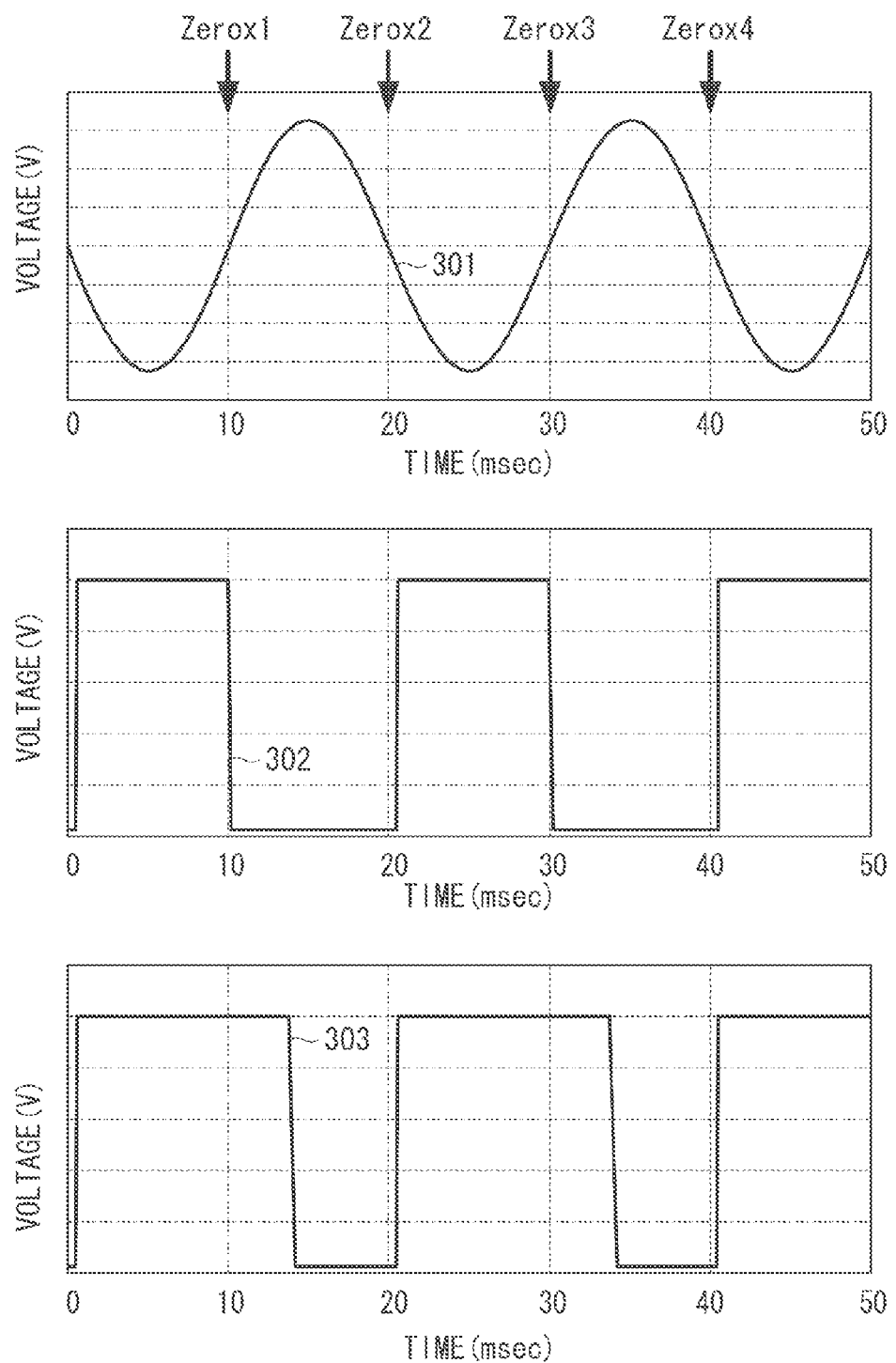
FIG. 12 is a diagram of a zero cross detection unit according to the third exemplary embodiment.

FIG. 12 is a simulation diagram for illustrating the influence of the Y capacitor discharging resistors R3 and R4 according to the first exemplary embodiment on the detection accuracy of the zero cross timing. The simulation is performed under the conditions of the X capacitor C1=0.56 µF, the Y capacitor C3=C4=2200 pF, the X capacitor discharging resistor R2=1730 kΩ, and the Y capacitor discharging resistor R3=R4=150 kΩ.

A waveform 301 indicates a voltage waveform (230 Vrms, 50 Hz) supplied from the AC power source 201. Zero cross points Zerox 1, Zerox 2, Zerox 3, and Zerox 4 are indicated by arrows above the waveform.

A waveform 302 indicates a zero cross waveform with the Y capacitor discharging resistors energized (the second state). From the waveform 302, it can be seen that the timing at which the Zerox signal falls agrees with the zero cross Zerox 1 and Zerox 3 of the AC power source 201. The timing of Zerox 4 can be detected inside the CPU 203. More specifically, a period from Zerox 1 to Zerox 3 (one cycle of the AC power source 201) is calculated by the CPU 203 (20 msec in the present exemplary embodiment). The CPU 203 estimates the timing after half a cycle (10 ms in the present exemplary embodiment) from Zerox 3, for example, which is the timing at which the Zerox signal falls, as the timing of Zerox 4. Thus, if either the timing at which the zero cross falls or the timing at which the zero cross rises can be determined, both the zero crosses of rise and fall can be detected and estimated.

A waveform 303 indicates a zero cross waveform in a state where the Y capacitor discharging resistor is cut off to describe the effect of the Y capacitor discharging resistor. It can be seen that the timing at which the waveform 303 rises and falls does not agree with the zero cross of the AC power source 201 in the waveform 301. This error is caused by the time taken until the electric charges charged in the Y capacitors C3 and C4 are discharged. In a state of the waveform 303, the CR delay due to the X capacitor discharging resistor R2 and the Y capacitors C3 and C4 causes an error in detecting the zero cross timing.

In the waveform 302, the resistance value of the Y capacitor discharging resistors R3 and R4 is small, so that the CR delay can be reduced to allow improving the error in detecting the zero cross timing. The error in detecting the zero cross timing in the state of the waveform 303 is varied depending on the AC voltage supplied from the AC power source 201 and a state where the external power source unit 40 is grounded (GND). For this reason, it is difficult to accurately detect the zero cross timing from the Zerox signal of the waveform 303.

In waveform 303, it is possible to detect the cycle (frequency) of the AC voltage supplied from the AC power source 201 indicated in the waveform 301 based on rising or falling timing or the number of times.

Figure 13A:
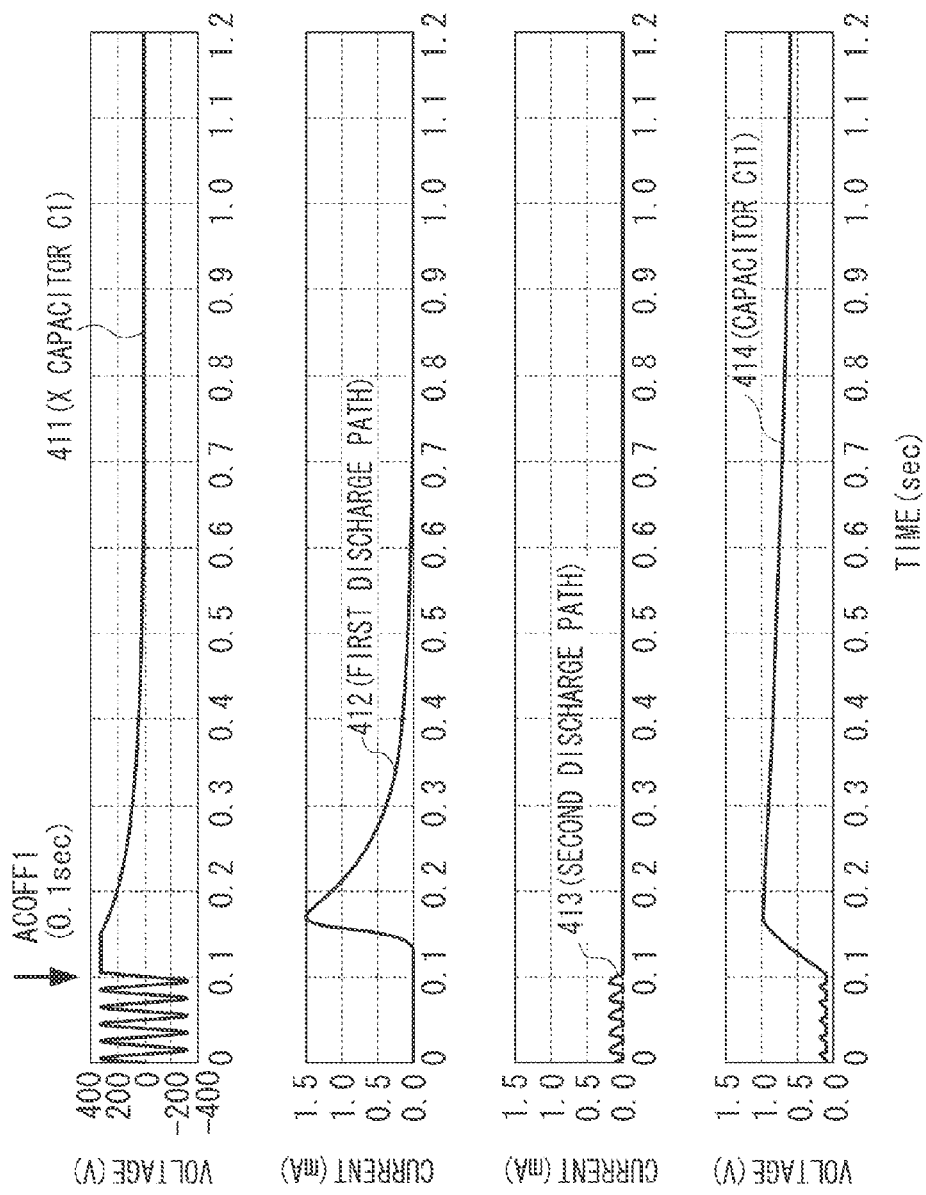
FIGS. 13A and 13B are diagrams of an X capacitor discharging unit according to the third exemplary embodiment.
Figure 13B:
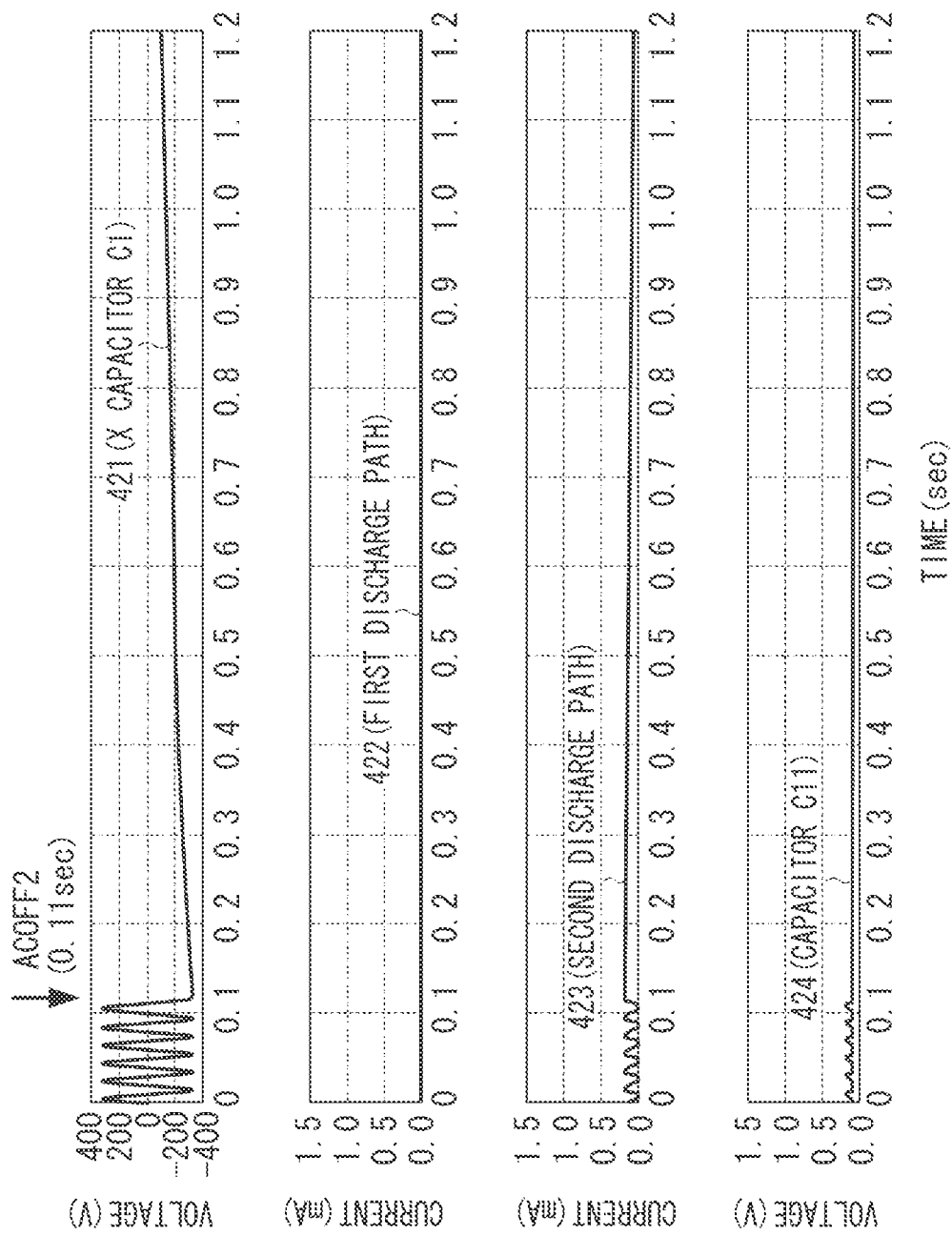

FIGS. 13A and 13B are simulation diagrams for illustrating the X capacitor discharge operation of the power source circuit 200. The simulation is performed under the conditions that the voltage of the AC power source 201 was 230 Vrms (effective voltage value), a frequency=50 Hz, the X capacitor C1=0.56 µF, the X capacitor discharging resistor R2=1730 kΩ, and the Y capacitor discharging resistor R3=R4=150 kΩ.

FIG. 13A describes a discharge unit by the power-cable pulling-out detection unit being a first discharge path of the X capacitor C1. A waveform 411 indicates the voltage of the AC power source 201 applied across the X capacitor C1. In the present exemplary embodiment, it is presumed that the power cable 50 is pulled out at a timing ACOFF1 (at a timing of 0.10 sec). A waveform 412 indicates a current flowing to the first discharge path. A waveform 413 indicates a current flowing to the second discharge path. A waveform 414 indicates voltage charged to a charging capacitor C11 in the power-cable pulling-out detection unit. If the power cable 50 is pulled out at the timing ACOFF1, current flows from the X capacitor C1 to the charging capacitor C11 via the charging resistor R11, so that the voltage of the charging capacitor C11 increases as the waveform 414 indicates. The voltage of the charging capacitor C11 increases and becomes higher than the forward voltage of a diode D11 to cause a current to flow to the base of the transistor Q1 via the diode D11. When a threshold voltage by the diode D11 is to be changed, a Zener diode may be used. If the transistor Q1 becomes on state, current indicated by the waveform 412 flows to the Y capacitor discharging resistor R3 being the first discharge path to discharge electric charges in the X capacitor C1. In the simulation, it can be seen that the voltage of the X capacitor C1 is lowered from approximately 325 V to approximately 0 V 1 second after the power cable 50 is pulled out. In the present exemplary embodiment, the voltage of the X capacitor C1 is set to be lowered to at least equal to or less than 36% 1 second after the power cable 50 is pulled out.

FIG. 13B illustrates a discharge operation by the X capacitor discharging resistor R2 being a second discharge path of the X capacitor C1.

A waveform 421 indicates the voltage of the AC power source 201 applied across the X capacitor C1. In the present exemplary embodiment, it is presumed that the power cable 50 is pulled out at a timing ACOFF2 (at a timing of 0.11 sec). A waveform 422 indicates a current flowing to the first discharge path. A waveform 423 indicates a current flowing to the second discharge path. A waveform 424 indicates voltage charged to a charging capacitor C11 in the power-cable pulling-out detection unit.

If the power cable 50 is pulled out at the timing ACOFF2, current does not flow from the X capacitor C1 to the charging capacitor C11, so that the voltage of the charging capacitor C11 does not increase as the waveform 424 indicates. Therefore, as the waveform 422 indicates, current does not flow to the first discharge path because the discharge unit using the power-cable pulling-out detection unit does not operate.

From the waveform 423, it can be seen that discharge current starts flowing to the second discharge path at the timing ACOFF2 when the power cable 50 is pulled out. The waveform of the voltage across the X capacitor C1 indicated by the waveform 421 is determined by the capacitance of the X capacitor C1 and the resistance of the X capacitor discharging resistor R2. In the simulation, it can be seen that the voltage across the X capacitor C1 is lowered from 325 V to 108 V (to approximately 33%) for 1 second. In the simulation, the voltage across the X capacitor C1 is set to be lowered to equal to or less than approximately 36% 1 second after the power cable 50 is pulled out.

The present exemplary embodiment has described the method in which, if the charging state of the X capacitor C1 is positive (the LIVE side is higher in potential than the NEUTRAL side), the X capacitor C1 is discharged using the power-cable pulling-out detection unit (the first discharge path) and, if the charging state of the X capacitor C1 is negative, (the LIVE side is lower in potential than the NEUTRAL side), the X capacitor C1 is discharged using the X capacitor discharging resistor R2 (the second discharge path). The present exemplary embodiment is also effective in a case where, if the charging state of the X capacitor C1 is negative (the LIVE side is lower in potential than the NEUTRAL side), the X capacitor C1 is discharged using the power-cable pulling-out detection unit (the first discharge path) and, if the charging state of the X capacitor C1 is positive, (the LIVE side is higher in potential than the NEUTRAL side), the X capacitor C1 is discharged using the X capacitor discharging resistor R2 (the second discharge path).

FIG. 14 is a flow chart illustrating the control sequence of the power source circuit 200 controlled by the CPU 203 according to the first exemplary embodiment. In step S500, control is started, and then processing proceeds to step S501. In step S501, the standby signal is brought into a high state to supply power to the zero cross detection circuit 202, energizing the Y capacitor discharging resistors R3 and R4 (also referred to as a second state).

If the power cable 50 is pulled out in the second state, the X capacitor C1 is discharged by the Y capacitor discharging resistors R3 and R4 because the transistor Q1 is in an ON state.

In step S502, the zero cross of the AC power source 201 is detected based on the fall timing of the Zerox signal. In the present exemplary embodiment, a case where the Zerox fall timing is adjusted to agree with the zero cross timing is described. In a case where the Zerox rise timing is adjusted to agree with the zero cross timing, the zero cross of the AC power source 201 has only to be detected based on the rise timing of the Zerox signal.

In step S503, the above processing is repeated until it is determined that the standby state is ended. If it is determined that the standby state is ended (YES in step S503), the processing proceeds to step S504.

In step S504, the standby signal is brought into a low state to cut off the supply of power to the zero cross detection circuit 202, bringing the Y capacitor discharging resistors R3 and R4 into a cut-off state (the first state).

If the power cable 50 is pulled out in the first state, the X capacitor C1 is discharged by the X capacitor discharging resistor R2 and the power-cable pulling-out detection unit. The above processing is ended and then, in step S505, control is ended.

The power source circuit 200 according to the present exemplary embodiment has the following four characteristics:
1) The power source circuit 200 includes a first state where the transistor Q1 is in a cutoff state and a second state where the transistor Q1 is in energization state;
2) The transistor Q1 is used as a means of cutting off current flowing to the Y capacitor discharging resistors R3 and R4;
3) The power-cable pulling-out detection unit turns on the transistor Q1 to discharge the X capacitor using the Y capacitor discharging resistor R3 as a means of discharging the X capacitor; and
4) The resistor R2 doubles as the zero cross detection resistor in the zero cross detection unit 202 and the X capacitor discharging resistor.

The above four characteristics allow switching between the power saving state in the zero cross detection unit 202 and the zero cross detectable state using one high-voltage transistor Q1 and using the high-voltage transistor Q1 as an X capacitor discharging unit in the power-cable pulling-out detection unit. Thus, the power source circuit 200 allows reducing the power consumption of the power source circuit including the zero cross detection unit and discharging the X capacitor with a simple configuration if the power cable is pulled out.

A modification example according to the present exemplary embodiment is described below with reference to FIG. 11B. The description of a similar configuration described in FIG. 11A is omitted.

FIG. 11B is different in configuration from FIG. 11A in that connection destination of the resistors R2, R11 and R12 are interchanged between the LIVE and the NEUTRAL. A method for discharging the X capacitor C1 if the power cable 50 is pulled out is described with reference to FIG. 11B. If the charging state of the X capacitor C1 is negative, (the LIVE side is lower in potential than the NEUTRAL side), a state where the power cable 50 is pulled out is detected using the power-cable pulling-out detection unit (an input voltage detection unit for detecting that the input of the AC voltage is cut off) to turn on the transistor Q1, discharging the electric charges of the X capacitor C1 via the Y capacitor discharging resistor R4 and the BD1 (the first discharge path). If the charging state of the X capacitor C1 is positive (the LIVE side is higher in potential than the NEUTRAL side), the electric charges of the X capacitor C1 are discharged via the X capacitor discharging resistor R2 and the bridge diode BD1 (the second discharge path).

As illustrated in FIG. 11B, an effect similar to the one described in FIG. 11A can be acquired even in the case where, if the charging state of the X capacitor C1 is positive (the LIVE side is higher in potential than the NEUTRAL side), the electric charges of the X capacitor C1are discharged using the second discharge path, and if the charging state of the X capacitor C1 is negative, (the LIVE side is lower in potential than the NEUTRAL side), the electric charges of the X capacitor C1 are discharged using the first discharge path.

Figure 15:
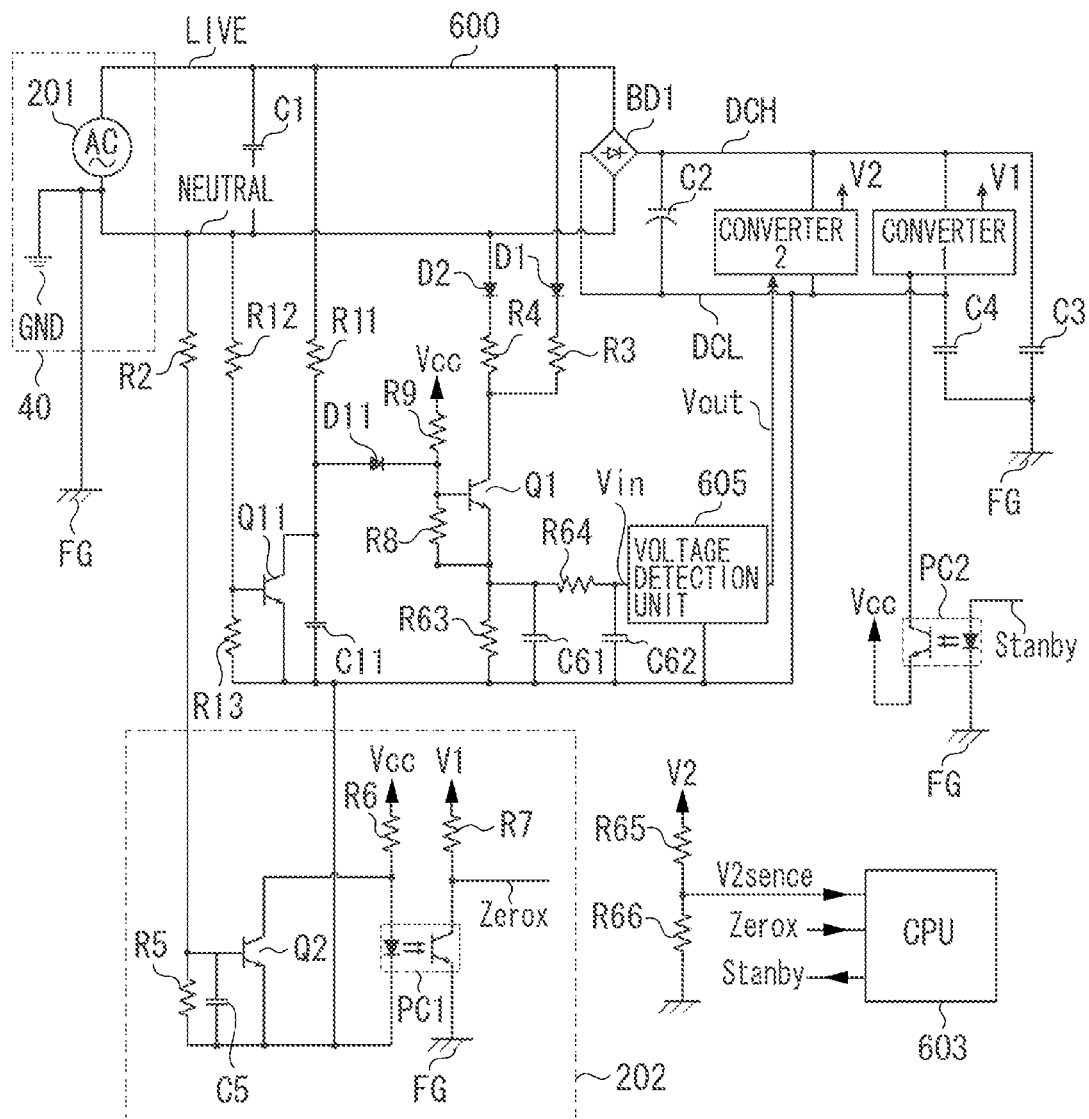
FIG. 15 is a diagram of a power source circuit according to a fourth exemplary embodiment.

A forth exemplary embodiment will be described. A power source circuit 600 including a voltage detection unit 605 according to a fourth exemplary embodiment is described below with reference to FIG. 15. The description of a configuration similar to the one of the third exemplary embodiment is omitted. In the latter stage where the full-wave rectification is performed by the bridge diode circuit BD1 and the capacitor C2, a converter 1 being a first converter and a converter 2 being a second converter are connected in parallel. The converter 2 is an insulative DC/DC converter, outputs a DC voltage V2 to the secondary side from a DC voltage on a primary side.

Current flowing to the Y capacitor discharging resistors R3 and R4 is charged to the capacitor C61. A discharging resistor R63 is provided. A voltage Vin smoothed by a resistor R64 and a capacitor C62 is input to the voltage detection unit 605. A decrease in voltage of the AC power source 201 decreases a charge current to the capacitor C61, decreasing the detection voltage Vin of the voltage detection unit 605. If the voltage Vin becomes equal to or less than a predetermined threshold voltage value Vth, the voltage detection unit 605 brings the Vout into a low state to stop the output of the converter 2. When the output of the converter 2 is stopped to lower the voltage of the output voltage V2, the voltage of a signal V2sense in which the output voltage V2 is divided by a ratio of the resistances of the resistors R65 and R66 is lowered. The CPU 603 determines that the converter 2 is stopped by the V2sense signal. Thus, the power source circuit 600 according to the present exemplary embodiment includes a unit for stopping the converter 2 if the output of the AC power source 201 is lowered due to power failure and detecting a state where the voltage of the AC power source 201 is lowered.

The power source circuit 600 according to the present exemplary embodiment is characterized in that the transistor Q1 (the first switching element) is turned off to cut off the current flowing to the Y capacitor discharging resistors R3 and R4 and reduce power consumed by the voltage detection unit 605.

Figure 16:
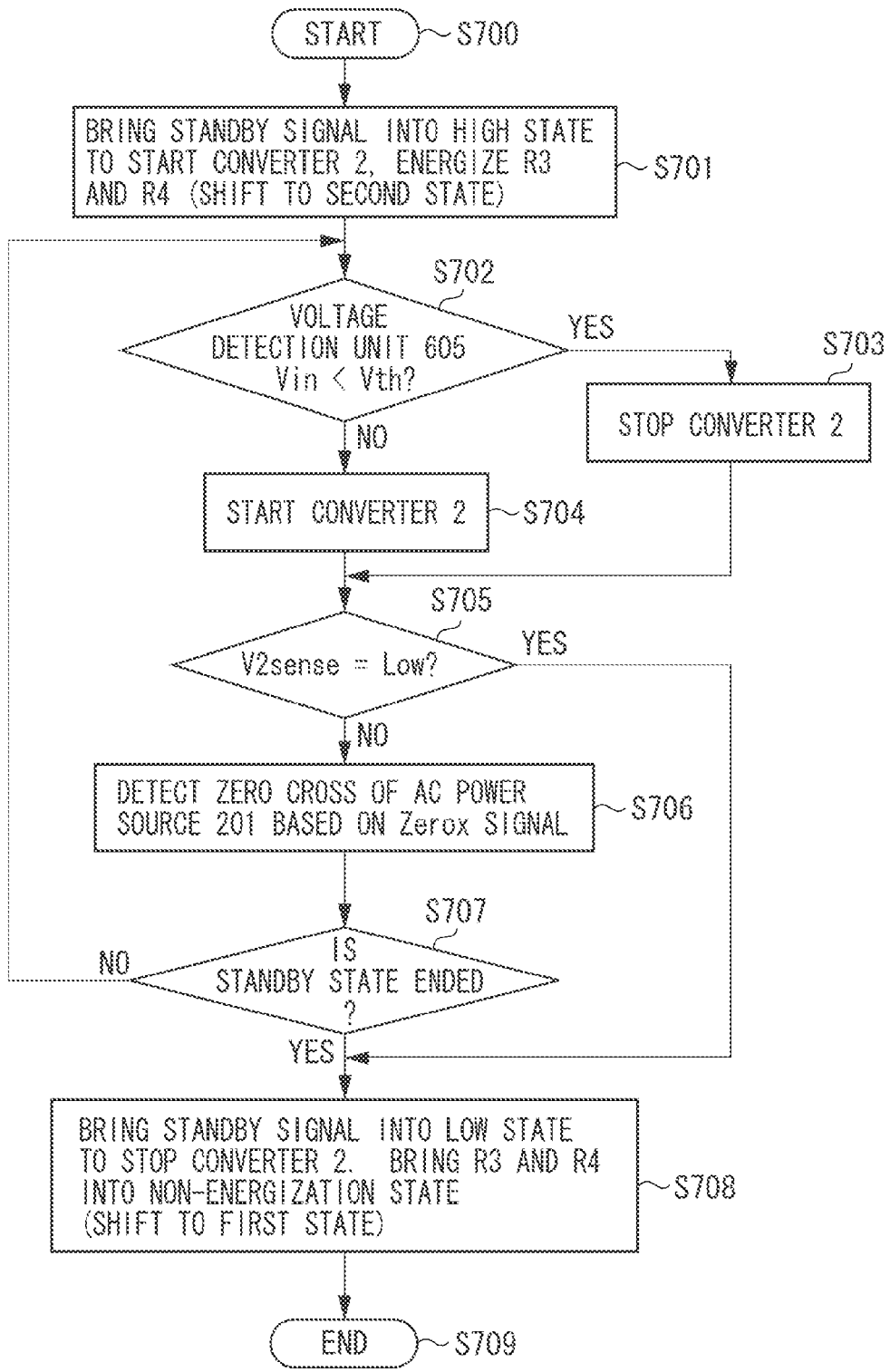
FIG. 16 is a control sequence of the power source circuit according to the fourth exemplary embodiment.

FIG. 16 is a flow chart illustrating the control sequence of the power source circuit 600 controlled by the CPU 603 according to the present exemplary embodiment. In step S700, control is started, and then processing proceed to step S701. In step S701, the standby signal is brought into a high state to supply power to the converter 2, the zero cross detection circuit 202, and the voltage detection unit 605, energizing the Y capacitor discharging resistors R3 and R4 (the second state).

In step S702, the CPU 603 determines whether the input voltage Vin of the voltage detection unit 605 is smaller than the threshold voltage value Vth. If the input voltage Vin is lower than the threshold voltage value Vth (YES in step S702), the processing proceeds to step S703. In step S703, the converter 2 is stopped. If the input voltage Vin is higher than the threshold voltage value Vth (NO in step S702), the processing proceeds to step S704. In step S704, the converter 2 is started. If the converter 2 is already started, the converter 2 is kept operated.

In step S705, the CPU 603 determines a power failure state based on the V2sense signal. If the V2sense signal is brought into a low state (YES in step S705), the CPU 603 detects that the voltage of the power source circuit 201 is lowered and the processing proceeds to step S708. In step S708, the standby signal is brought into a low state to stop the converter 2 (if the converter 2 is already stopped, the converter 2 is kept stopped) and cut off the current flowing to the zero cross detection circuit 202 and the voltage detection unit 605, not energizing the Y capacitor discharging resistors R3 and R4 (the first state). If the converter 2 is stopped in step 703 and if the voltage of the power source circuit 201 increases and a voltage larger than the threshold voltage value Vth is detected in step S702 before it is detected that the V2sense is in a low state in step S705, the converter 2 is started in step S704 to continue control.

In step S706, the zero cross of the AC power source 201 is detected based on the fall timing of the Zerox signal. In step S707, the above processing is repeated until the standby state is ended. In step S708, the above processing is ended. In step S709, control is ended.

The power source circuit 600 according to the present exemplary embodiment has the following five characteristics:
1) The power source circuit 600 includes a first state where the transistor Q1 is in a cutoff state and a second state where the transistor Q1 is in an energization state;
2) The transistor Q1 is used as a means of cutting off current flowing to the Y capacitor discharging resistors R3 and R4;
3) The power-cable pulling-out detection unit turns on the transistor Q1 to discharge the X capacitor using the Y capacitor discharging resistor R3 as a means of discharging the X capacitor;
4) The resistor R2 doubles as the zero cross detection resistor in the zero cross detection unit 202 and the X capacitor discharging resistor; and
5) The power source circuit 600 includes the voltage detection unit 605 that detects voltage using the current flowing to the Y capacitor discharging resistors R3 and R4.

The above characteristics allow reducing the power consumption of the power source circuit including the zero cross detection unit and the voltage detection unit and discharging the X capacitor with a simple configuration if the power cable is pulled out.

Figure 17:
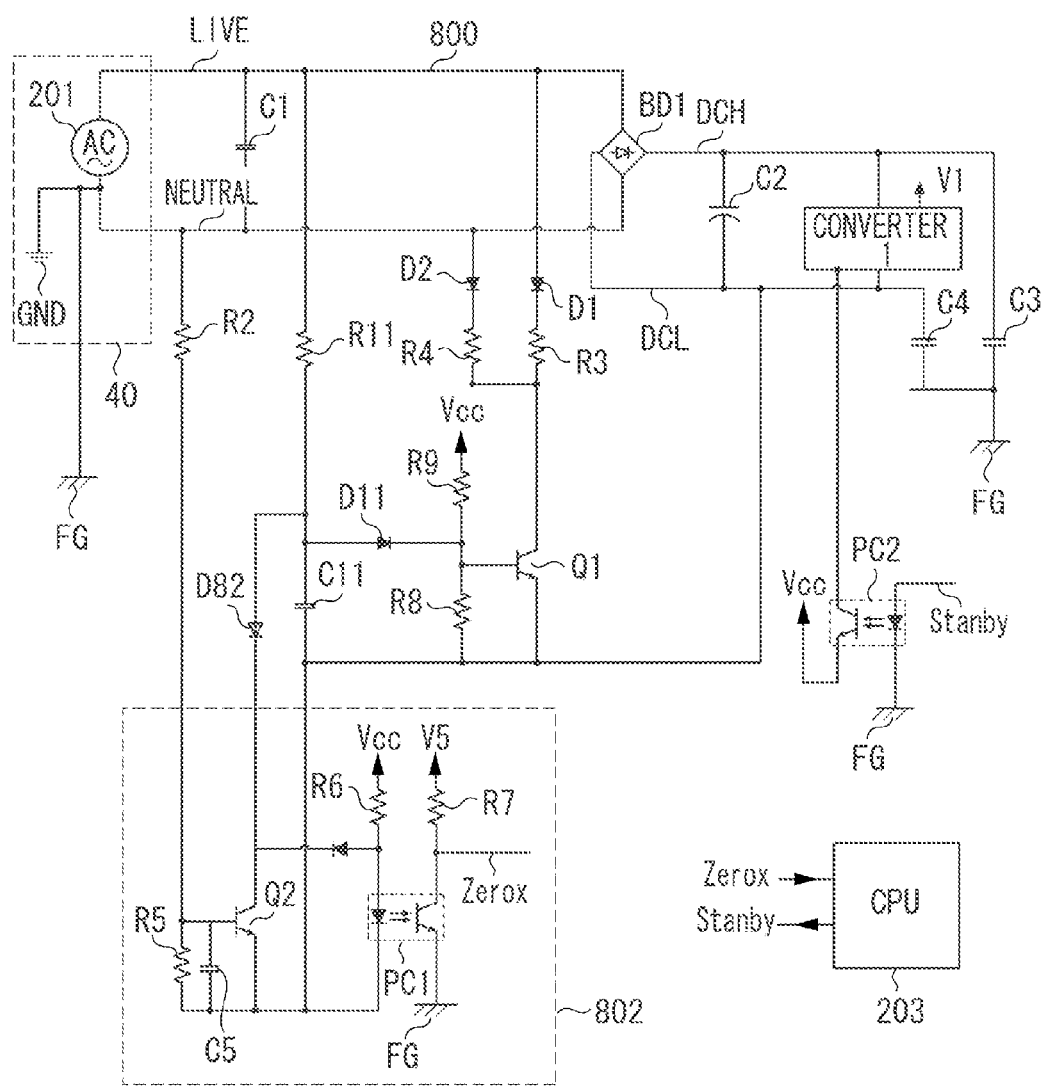
FIG. 17 is a diagram of a power source circuit according to a fifth exemplary embodiment.

A fifth exemplary embodiment will be described. A power source circuit 800 according to a fifth exemplary embodiment is described below with reference to FIG. 17. The present exemplary embodiment is characterized in that a zero cross detection unit 802 is used as a discharge unit of the charging capacitor C11 in the power-cable pulling-out detection unit. The description of a configuration similar to that of the third exemplary embodiment is omitted.

A method for discharging the X capacitor C1 in the power source circuit 800 is described below. If the power cable 50 is pulled out and the charging state of the X capacitor C1 is positive (the LIVE side is higher in potential than the NEUTRAL side), the X capacitor is discharged using the power-cable pulling-out detection unit (the first discharge path). The power-cable pulling-out detection unit is formed of the charging resistor R11, the charging capacitor C11, and the discharge unit of the charging capacitor C11 (in the present exemplary embodiment, the zero cross detection unit 802 doubles as the discharge unit of the charging capacitor C11). The charging capacitor C11 repeats a half-cycle (a first cycle) charged by the charging resistor R11 and a half-cycle (a second cycle) discharged by the zero cross detection unit 802 for each cycle of the AC power source 201. In a case where the AC voltage is supplied from the AC power source 201, the charge and discharge are repeated, so that the voltage of the charging capacitor C11 is held low.

A method for using the zero cross detection unit 802 as the discharge unit of the charging capacitor C11 is described below. As described above, if the potential supplied from the AC power source 201 of the NEUTRAL line is higher than that of the LIVE line, the transistor Q2 becomes on state. At this point, the charging capacitor C11 is discharged via a diode D82. A diode D81 and the diode D82 are back flow preventing diodes. The zero cross detection unit 802 detects the zero cross of the AC power source 201 and also functions as the discharge unit of the charging capacitor C11. If the power cable 50 is pulled out and the charging state of the X capacitor C1 is positive (the LIVE side is higher in potential than the NEUTRAL side), a charge current flows from the X capacitor C1 to the charging capacitor C11 via the charging resistor R11. If the voltage across the charging capacitor C11 increases and becomes equal to or larger than a predetermined threshold value, the transistor Q1 (the first switching element) is turned on.

If the charging state of the X capacitor C1 is negative (the LIVE side is lower in potential than the NEUTRAL side), electric charges in the X capacitor C1 are discharged via the X capacitor discharging resistor R2 and the bridge diode BD1 (the second discharge path).

The power source circuit 800 according to the present exemplary embodiment has the following five characteristics:
1) The power source circuit 800 includes a first state where the transistor Q1 is in a cutoff state and a second state where the transistor Q1 is in energization;
2) The transistor Q1 is used as a means of cutting off current flowing to the Y capacitor discharging resistors R3 and R4;
3) The power-cable pulling-out detection unit turns on the transistor Q1 to discharge the X capacitor using the Y capacitor discharging resistor R3 as a means of discharging the X capacitor;
4) The resistor R2 doubles as the zero cross detection resistor in the zero cross detection unit 202 and the X capacitor discharging resistor; and
5) The zero cross detection unit 802 is used as the discharge unit of the charging capacitor C11 in the power-cable pulling-out detection unit.

The above characteristics allow reducing the power consumption of the power source circuit including the zero cross detection unit and discharging the X capacitor with a simple configuration if the power cable is pulled out.

Figure 18:
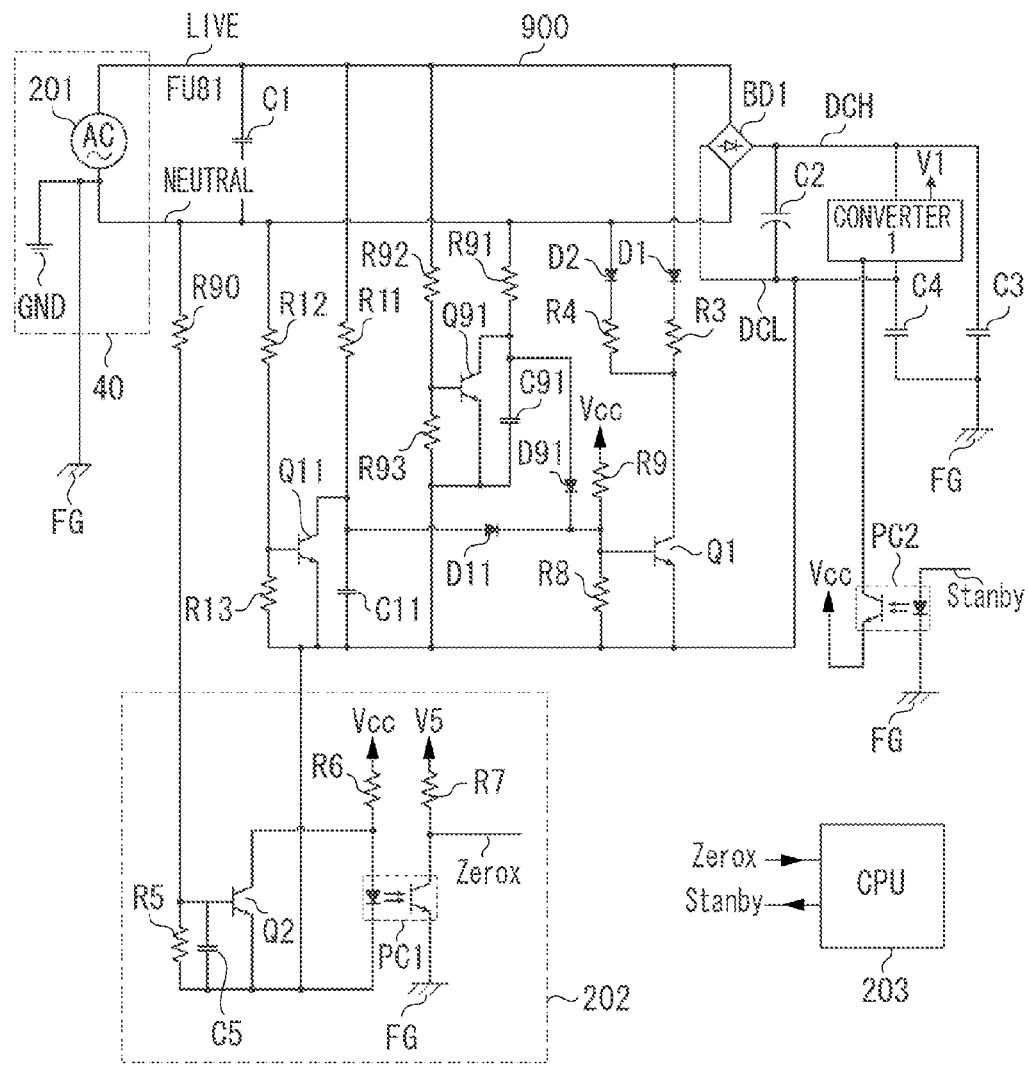
FIG. 18 is a diagram of a power source circuit according to a sixth exemplary embodiment.

A sixth exemplary embodiment will be described. A power source circuit 900 according to a sixth exemplary embodiment is described below with reference to FIG. 18. The description of a configuration similar to that of the first exemplary embodiment is omitted.

The following describes a case where the X capacitor C1 is discharged using the power-cable pulling-out detection unit both if the charging state of the X capacitor C1 is positive (the LIVE side is higher in potential than the NEUTRAL side) and if the charging state of the X capacitor C1 is negative (the LIVE side is lower in potential than the NEUTRAL side).

A method for discharging the X capacitor C1 if the power cable 50 is pulled out is described below. A first power-cable pulling-out detection unit is used to detect a state where the power cable is pulled out if the charging state of the X capacitor C1 is positive (the LIVE side is higher in potential than the NEUTRAL side). The first power-cable pulling-out detection unit is formed of the charging resistor R11, the charging capacitor C11, and the discharge unit of the charging capacitor C11. The power source circuit 900 uses the resistors R12 and R13 and the transistor Q11 as the discharge unit of the charging capacitor C11.

A second power-cable pulling-out detection unit is used to detect a state where the power cable is pulled out if the charging state of the X capacitor C1 is negative (the LIVE side is lower in potential than the NEUTRAL side). The second power-cable pulling-out detection unit is formed of a charging resistor R91, a charging capacitor C91, and the discharge unit of the charging capacitor C91. The power source circuit 900 uses resistors R92 and R93 and a transistor Q91 as the discharge unit of the charging capacitor C91. A diode D91 is also provided.

If the power cable 50 is pulled out and the charging state of the X capacitor C1 is positive (the LIVE side is higher in potential than the NEUTRAL side), charge current flows from the X capacitor C1 to the charging capacitor C11 via the charging resistor R11. If the voltage of the charging capacitor C11 increases and becomes equal to or larger than a predetermined threshold value, the transistor Q1 (the first switching element) is turned on.

If the power cable 50 is pulled out and the charging state of the X capacitor C1 is negative (the LIVE side is lower in potential than the NEUTRAL side), charge current flows from the X capacitor C1 to the charging capacitor C91 via the charging resistor R91. If the voltage of the charging capacitor C91 increases and becomes equal to or larger than the predetermined threshold value, the transistor Q1 (the first switching element) is turned on. In the power source circuit 900 according to the present exemplary embodiment, a case is described where a zero cross detection resistor R90 is higher in resistance than the X capacitor discharging resistor R2 (which is the zero cross detection resistor) described in the first exemplary embodiment, so that the electric charges in the X capacitor C1 cannot be discharged in a predetermined time period. In the power source circuit 900, the zero cross detection resistor R90 is so high in resistance that it does not satisfy a function as the X capacitor discharging resistor, which requires the second power-cable pulling-out detection unit. However, the resistance in the zero cross detection resistor R90 of the power source circuit 900 is high, so that the power consumption thereof can be further reduced as compared with that of the power source circuit 200.

The power source circuit 900 according to the present exemplary embodiment has the following three characteristics:
1) The power source circuit 900 includes a first state where the transistor Q1 is in a cutoff state and a second state where the transistor Q1 is on in an energization state;
2) The transistor Q1 is used as a means of cutting off current flowing to the Y capacitor discharging resistors R3 and R4; and
3) The power-cable pulling-out detection unit turns on the transistor Q1 to discharge the X capacitor using the Y capacitor discharging resistors R3 and R4 as a means of discharging the X capacitor.

The above characteristics allow reducing the power consumption of the power source circuit including the zero cross detection unit and discharging the X capacitor with a simple configuration if the power cable is pulled out.

A seventh exemplary embodiment will be descried. A power source circuit 1000 according to a seventh exemplary embodiment is described below with reference to FIG. 19. The description of a configuration similar to that of the third exemplary embodiment is omitted. The configuration in which a current fuse FU 102 is provided at the latter stage of the X capacitor C1 is described below.

Current fuses FU 101 and FU 102 are provided. The current fuse FU 101 is used for cutting off power supplied from the power source circuit 201 if current supplied to the entire apparatus including the image heating apparatus 100 and the power source circuit 1000 is excessive.

The current fuse FU 102 is used for cutting off power supply if excessive current flows to the circuit of the converter 1 (the circuit connected to the latter stage of the bridge diode BD1). The current fuse FU 102 causes only the current supplied to the converter 1 to flow. For this reason, the current fuse FU 102 may use a current fuse lower in fusing current than the one used in the current fuse FU 101 which causes current supplied to the entire apparatus to flow. Therefore, this case enables a fuse to blow out earlier than the case where only the current fuse FU 101 is used. A common mode choke coil L100 is used to reduce noise. An X capacitor C101 is also provided. It is obvious that the current fuse FU 102 low in fusing current cannot be arranged at the previous stage of the X capacitor C1 in a noise filter configuration using the X capacitor C1, the common mode choke coil L100, and the X capacitor C101. (The current fuse FU 102 is arranged at the previous stage of the X capacitor C1 to cause current supplied to the image heating apparatus 100 to flow to the FU102, so that the FU102 low in fusing current cannot be used.)

In the power source circuit 1000, if the current fuse FU 102 blows out, the discharge path in a case where the charging state of the X capacitor C1 is negative (the LIVE side is lower in potential than the NEUTRAL side) is cut off, so that the X capacitor C1 cannot be discharged via the X capacitor discharging resistor R2 and the bridge diode BD1. If the current fuse FU 102 blows out, an electric-shock path via the X capacitor C101 is cut off by the current fuse FU 102, so that electric shock can be avoided if the user pulls out the power cable. Therefore, if the current fuse FU 102 blows out, the X capacitor C101 does not have to be quickly discharged.

Similarly, if the current fuse FU 101 blows out, the electric-shock path via the X capacitor C1 and the X capacitor C101 is cut off by the current fuse FU 101, so that electric shock can be avoided if the user pulls out the power cable. Therefore, if the current fuse FU 101 blows out, the X capacitor C1 and the X capacitor C101 do not have to be quickly discharged.

The power source circuit 1000 according to the present exemplary embodiment is characterized in that a resistor R101 and a diode D102 are provided as a third discharge path in a state where the current fuse FU 101 blows out. Even if the current fuse FU 101 blows out, the X capacitor C1 can be discharged via the X capacitor discharging resistor R2, the resistor R101, and the diode D102.

The power source circuit 1000 according to the present exemplary embodiment has the following six characteristics:
1) The power source circuit 1000 includes a first state where the transistor Q1 is in a cutoff state and a second state where the transistor Q1 is on in an energization state;
2) The transistor Q1 is used as a means of cutting off current flowing to the Y capacitor discharging resistors R3 and R4;
3) The power-cable pulling-out detection unit turns on the transistor Q1 to discharge the X capacitor using the Y capacitor discharging resistor R3 as a means of discharging the X capacitor;
4) The resistor R2 doubles as the zero cross detection resistor in the zero cross detection unit 202 and the X capacitor discharging resistor;
5) The current fuse FU 102 is provided at the latter stage of the X capacitor C1; and
6) The resistor R101 and the diode D102 are provided as the third discharge path at the previous stage of the current fuse FU 102.

The above characteristics allow reducing the power consumption of the power source circuit including the zero cross detection unit and discharging the X capacitor with a simple configuration if the power cable is pulled out.

An eighth exemplary embodiment will be described. A power source circuit 1100 according to an eighth exemplary embodiment is described below with reference to FIG. 20. The description of a configuration similar to that of the third exemplary embodiment is omitted. A configuration is described in which only a resistor R3 is provided as the Y capacitor discharging resistor.

Figure 20:
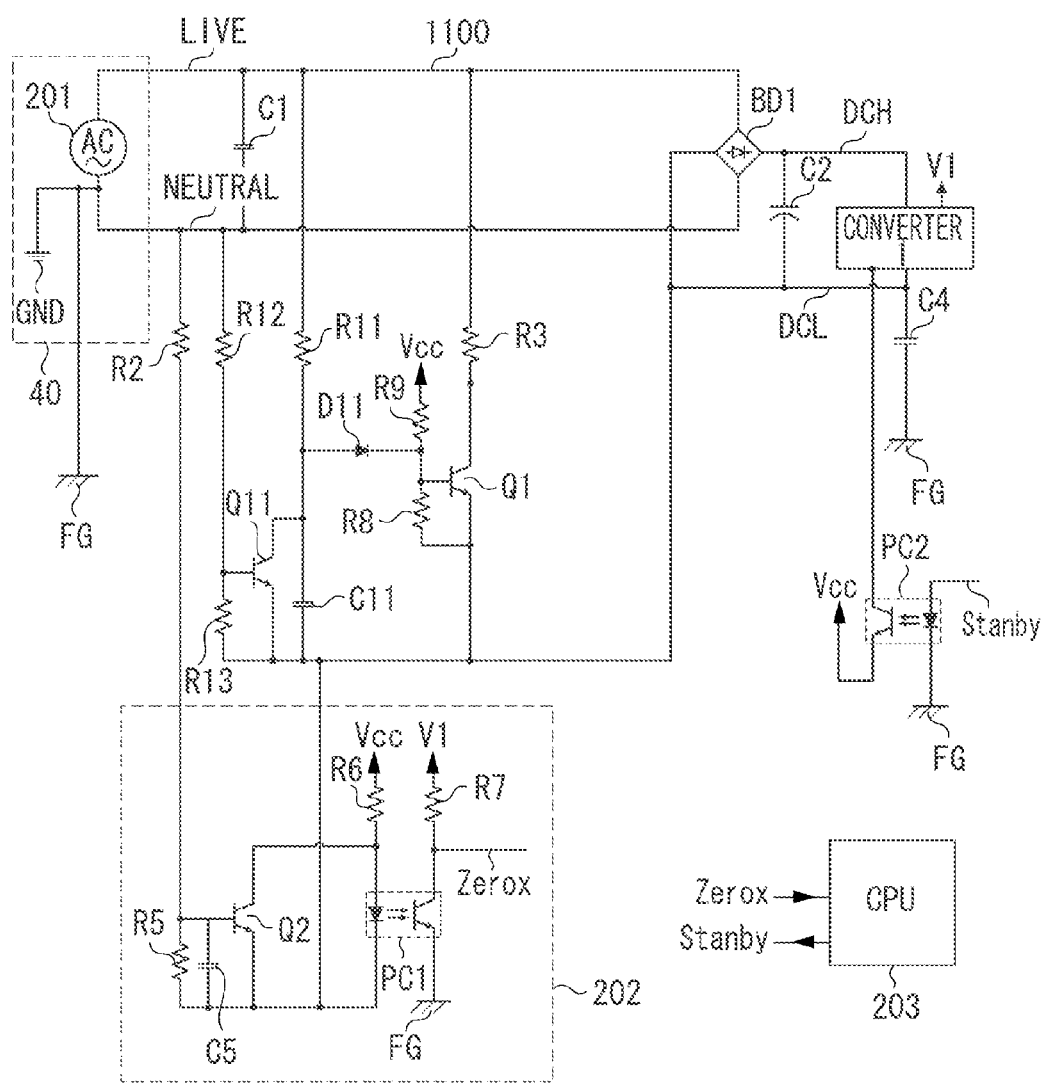
FIG. 20 is a diagram of a power source circuit according to an eighth exemplary embodiment.

The power source circuit 1100 illustrated in FIG. 20 includes only the resistor R3 acting as the Y capacitor discharging resistor. For a state where the external power source unit 40 is grounded, as illustrated in an example of FIG. 20, the NEUTRAL line is grounded to GND and only the capacitor C4 is provided as the Y capacitor. The state where the external power source unit 40 is grounded and the Y capacitor is connected is limited, however, the zero cross of the AC power source 201 can be detected by either one of the two Y capacitor discharging resistors R3 and R4 described in the power source circuit 200. The power source circuit 1100 smaller in a circuit configuration than the power source circuit 200 can switch between states where the zero cross can be detected and power consumption can be reduced.

The power source circuit 1100 according to the present exemplary embodiment has the following four characteristics:
1) The power source circuit 1100 includes a first state where the transistor Q1 is in a cutoff state and a second state where the transistor Q1 is in energization;
2) The transistor Q1 is used as a means of cutting off current flowing to the Y capacitor discharging resistor R3;
3) The power-cable pulling-out detection unit turns on the transistor Q1 to discharge the X capacitor using the Y capacitor discharging resistor R3 as a means of discharging the X capacitor; and
4) The resistor R2 doubles as the zero cross detection resistor in the zero cross detection unit 202 and the X capacitor discharging resistor.

The above characteristics allow reducing the power consumption of the power source circuit including the zero cross detection unit and discharging the X capacitor with a simple configuration if the power cable is pulled out.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2012-018911 filed Jan. 31, 2012 and No. 2012-018912 filed Jan. 31, 2012, which are hereby incorporated by reference herein in their entirety.

What is claimed is:
1. A power source comprising:
a rectifying unit configured to full-wave rectify an alternating current (AC) voltage to be input;
a first converter configured to convert a rectified voltage from the rectifying unit to a first voltage;
a zero cross detection unit configured to detect a zero cross of the AC voltage and supplied with the first voltage;
a first capacitance element connected between an output side of the rectified voltage from the rectifying unit and a ground;
a first discharging resistor connected to an input side of the AC voltage with respect to the rectifying unit and configured to discharge electric charges charged in the first capacitance element;
a voltage detection unit connected to the first discharging resistor and configured to detect the AC voltage and output a signal corresponding to the detected AC voltage;
a first switch unit configured to switch a signal supplied to the voltage detection unit and supplied with the first voltage;
a second capacitance element connected to an input side of the AC voltage with respect to the rectifying unit and across two lines to which the AC voltage is supplied; and
a second discharging resistor connected between an input side of the AC voltage with respect to the rectifying unit and the zero cross detection unit and configured to discharge electric charges charged in the second capacitance element, wherein the zero cross detection unit detects the zero cross of the AC voltage using a current flowing to the second discharging resistor and wherein the first discharging resistor is lower in resistance than the second discharging resistor; and wherein in a case where the power source is in an energy saving state, supply of the first voltage to the zero cross detection unit and the first switch unit is shut off.

2. The power source according to claim 1, further comprising:
a second converter configured to convert a voltage rectified by the rectifying unit to a second voltage, wherein
the second converter is connected in parallel to the first converter; and
in a case where the first switch unit is in off state, the operation of the second converter is stopped according to the signal output from the voltage detection unit.

3. The power source according to claim 1, wherein if the zero cross detection unit cannot detect the zero cross of the AC voltage for at least a predetermined time period input of the AC voltage being shut off is detected.

4. The power source according to claim 1, wherein if the voltage detection unit detects a voltage lower than the threshold value, input of the AC voltage being shut off is detected.

5. An image forming apparatus comprising:
an image forming unit configured to form an image;
a power source configured to supply power to the image forming unit, the power source comprising:
a rectifying unit configured to full-wave rectify an alternating current (AC) voltage to be input;
a first converter configured to convert a rectified voltage from the rectifying unit to a first voltage;
a zero cross detection unit configured to detect a zero cross of the AC voltage and supplied with the first voltage;
a first capacitance element connected between an output side of the rectified voltage of the rectifying unit and a ground;
a first discharging resistor connected to an input side of the AC voltage with respect to the rectifying unit and configured to discharge electric charges charged in the first capacitance element;
a voltage detection unit connected to the first discharging resistor and configured to detect the AC voltage and output a signal corresponding to the detected AC voltage; and
a first switch unit configured to switch a signal input to the voltage detection unit and supplied with the first voltage;
a second capacitance element connected to an input side of the AC voltage with respect to the rectifying unit and across two lines to which the AC voltage is supplied; and
a second discharging resistor connected between an input side of the AC voltage with respect to the rectifying unit and the zero cross detection unit and configured to discharge electric charges charged in the second capacitance element,
wherein the zero cross detection unit detects the zero cross of the AC voltage using a current flowing to the second discharging resistor and wherein the first discharging resistor is lower in resistance than the second discharging resistor,
wherein in a case where the power source is in an energy saving state, supply of the first voltage to the zero cross detection unit and the first switch unit is shut off.

6. The imaging forming apparatus according to claim 5, further comprising:
a second converter configured to convert a voltage rectified by the rectifying unit to a second voltage, wherein
the image forming unit comprises a fixing unit configured to fix an image formed on a recording material; and
wherein the power source supplies the AC voltage to the fixing unit.

7. The imaging forming apparatus according to claim 5, wherein if the zero cross detection unit cannot detect the zero cross of the AC voltage for at least a predetermined time period, input of the AC voltage being shut off is detected.

8. The imaging forming apparatus according to claim 5, wherein if the voltage detection unit detects a voltage lower than the threshold value, input of the AC voltage being shut off is detected.

9. A power failure detection apparatus comprising:
a zero cross detection unit configured to detect the zero cross of AC voltage to be input;
a first capacitance element connected between an output side of a rectified voltage of the rectifying unit for rectifying the AC voltage and a ground;
a first discharging resistor connected to an input side of the AC voltage with respect to the rectifying unit and configured to discharge electric charges charged in the first capacitance element;
a voltage detection unit configured to detect the value of the AC voltage;
a first switch unit connected between the first discharging resistor and the voltage detection unit and configured to switch a signal supplied to the voltage detection unit;
a second capacitance element connected across two lines to which the AC voltage is supplied;
a first discharge path in a case where the electric charges charged in the second capacitance element are positive; and
a second discharge path in a case where the electric charges charged in the second capacitance element are negative,
wherein the first discharging resistor is used as the first discharge path, a second discharging resistor is used as the second discharge path, the zero cross detection unit detects the zero cross using a current flowing to the second discharging resistor, and the first discharging resistor is lower in resistance than the second discharging resistor.

10. The power failure detection apparatus according to claim 9,
wherein the voltage detection unit includes a charging resistor, a charging capacitor and a discharge unit for discharging the charging capacitor,
wherein the charge of the charging capacitor using the charging resistor and the discharge of the charging capacitor using the discharge unit are repeated every half cycle of the AC voltage, and
wherein the voltage detection unit turns on the first switch if the voltage of the charging capacitor increases and becomes equal to or larger than a threshold value.

11. The power failure detection apparatus according to claim 10, wherein the charging capacitor is discharged using the zero cross detection unit.

12. The power failure detection apparatus according to claim 9, further comprising:
a current fuse provided at the back of the second capacitance element; and
a third discharge path provided between the current fuse and the second capacitance element, wherein the third discharge path discharges electric charges in the second capacitance element if the current fuse blows out.

* * * * *